US009482755B2

(12) United States Patent
Cramer et al.

(10) Patent No.: US 9,482,755 B2
(45) Date of Patent: *Nov. 1, 2016

(54) MEASUREMENT SYSTEM HAVING AIR TEMPERATURE COMPENSATION BETWEEN A TARGET AND A LASER TRACKER

(71) Applicant: FARO Technologies, Inc., Lake Mary, FL (US)

(72) Inventors: Peter G. Cramer, West Chester, PA (US); Robert E. Bridges, Kennett Square, PA (US); Nils P. Steffensen, Kennett Square, PA (US); Robert C. Mehler, Coatesville, PA (US); Kenneth Steffey, Longwood, FL (US); John M. Hoffer, Bel Air, MD (US); Daniel G. Lasley, West Chester, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,259

(22) Filed: Oct. 9, 2014

(65) Prior Publication Data

US 2015/0022826 A1 Jan. 22, 2015

Related U.S. Application Data

(60) Division of application No. 13/832,658, filed on Mar. 15, 2013, which is a continuation of application No.

(Continued)

(51) Int. Cl.
*G01S 17/66* (2006.01)
*G01B 11/03* (2006.01)
(Continued)

(52) U.S. Cl.
CPC ............. *G01S 17/66* (2013.01); *G01B 11/002* (2013.01); *G01B 11/03* (2013.01); *G01B 11/14* (2013.01);
(Continued)

(58) Field of Classification Search
CPC .............. G01C 15/002; G01C 15/004; G02B 5/12–5/122; G01S 17/74; G01S 17/66; G01S 17/42; G01K 7/22; G01K 7/02; G01B 11/03
USPC ......................................................... 359/529
See application file for complete search history.

(56) References Cited

U.S. PATENT DOCUMENTS 2,612,994 A 10/1952 Woodland
2,682,804 A 7/1954 Clifford et al.
(Continued)

FOREIGN PATENT DOCUMENTS

CA 2811444 3/2012
CH 589856 A5 7/1977
(Continued)

OTHER PUBLICATIONS

German Office Action for Patent Application No. 11 2012 001 082.5 filed Feb. 29, 2012; Issuance: Apr. 14, 2015; Mailed Apr. 22, 2015; 6 pages.
(Continued)

*Primary Examiner* — Michael P Lapage
(74) *Attorney, Agent, or Firm* — Cantor Colburn LLP

(57) ABSTRACT

A target is provided having a retroreflector. A body is provided having a spherical exterior portion, the body containing a cavity. The cavity is sized to hold the retroreflector, the cavity open to the exterior of the body and having at least one surface opposite the opening, the retroreflector at least partially disposed in the cavity, wherein the retroreflector and at least one surface define a space therebetween. A transmitter is configured to emit an electromagnetic signal. A first actuator is configured to initiate emission of the electromagnetic signal, wherein the transmitter and the first actuator are affixed to the body.

5 Claims, 22 Drawing Sheets

Related U.S. Application Data

13/407,983, filed on Feb. 29, 2012, now Pat. No. 8,467,072, which is a continuation-in-part of application No. 13/370,339, filed on Feb. 10, 2012, now Pat. No. 8,740,396, said application No. 13/832,658 is a continuation-in-part of application No. 12/620,070, filed on Nov. 17, 2009, now Pat. No. 8,525,983.

(60) Provisional application No. 61/448,823, filed on Mar. 3, 2011, provisional application No. 61/475,703, filed on Apr. 15, 2011, provisional application No. 61/592,049, filed on Jan. 30, 2012, provisional application No. 61/442,452, filed on Feb. 14, 2011, provisional application No. 61/115,136, filed on Nov. 17, 2008.

(51) Int. Cl.

| | | |
|---|---|---|
| *G01S 7/48* | (2006.01) | |
| *G01S 17/42* | (2006.01) | |
| *G01S 17/74* | (2006.01) | |
| *G01C 15/00* | (2006.01) | |
| *G01C 15/06* | (2006.01) | |
| *G01B 11/14* | (2006.01) | |
| *G02B 5/12* | (2006.01) | |
| *G01K 7/02* | (2006.01) | |
| *G01K 7/22* | (2006.01) | |
| *G01S 7/497* | (2006.01) | |
| *G01B 11/00* | (2006.01) | |
| *G01B 11/26* | (2006.01) | |
| *G02B 5/122* | (2006.01) | |

(52) U.S. Cl.
CPC ............. *G01B 11/26* (2013.01); *G01C 15/004* (2013.01); *G01C 15/06* (2013.01); *G01K 7/02* (2013.01); *G01K 7/22* (2013.01); *G01S 7/48* (2013.01); *G01S 7/497* (2013.01); *G01S 17/42* (2013.01); *G01S 17/74* (2013.01); *G02B 5/12* (2013.01); *G02B 5/122* (2013.01)

(56) References Cited

U.S. PATENT DOCUMENTS

| | | |
|---|---|---|
| 2,484,641 A | 3/1957 | Keuffel et al. |
| 2,784,641 A | 3/1957 | Keuffel et al. |
| 3,339,457 A | 9/1967 | Pun |
| 3,365,717 A | 1/1968 | Holscher |
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,178,515 A | 12/1979 | Tarasevich |
| 4,297,030 A | 10/1981 | Chaborski |
| 4,403,857 A | 9/1983 | Holscher |
| 4,413,907 A | 11/1983 | Lane |
| 4,453,825 A | 6/1984 | Buck et al. |
| 4,498,764 A | 2/1985 | Bolkow et al. |
| 4,521,107 A | 6/1985 | Chaborski et al. |
| 4,531,833 A | 7/1985 | Ohtomo |
| 4,537,475 A | 8/1985 | Summers et al. |
| 4,560,270 A | 12/1985 | Wiklund et al. |
| 4,632,547 A | 12/1986 | Kaplan et al. |
| 4,652,130 A | 3/1987 | Tank |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,731,812 A | 3/1988 | Akerberg |
| 4,731,879 A | 3/1988 | Sepp et al. |
| 4,767,257 A | 8/1988 | Kato |
| 4,777,660 A | 10/1988 | Gould et al. |
| 4,790,651 A | 12/1988 | Brown et al. |
| 4,839,507 A | 6/1989 | May |
| 4,983,021 A | 1/1991 | Fergason |
| 5,002,388 A | 3/1991 | Ohishi et al. |
| 5,051,934 A | 9/1991 | Wiklund |
| 5,069,524 A | 12/1991 | Watanabe et al. |
| 5,082,364 A | 1/1992 | Russell |
| 5,090,131 A | 2/1992 | Deer |
| 5,121,242 A * | 6/1992 | Kennedy ............ H04B 10/2587 359/302 |
| 5,137,354 A | 8/1992 | Devos et al. |
| 5,138,154 A | 8/1992 | Hotelling |
| 5,162,862 A | 11/1992 | Bartram et al. |
| 5,198,868 A | 3/1993 | Saito et al. |
| 5,237,384 A | 8/1993 | Fukunaga et al. |
| 5,263,103 A | 11/1993 | Kosinski |
| 5,267,014 A | 11/1993 | Prenninger |
| 5,301,005 A | 4/1994 | Devos et al. |
| 5,313,409 A | 5/1994 | Wiklund et al. |
| 5,319,434 A | 6/1994 | Croteau et al. |
| 5,347,306 A | 9/1994 | Nitta |
| 5,392,521 A | 2/1995 | Allen |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,440,326 A | 8/1995 | Quinn |
| 5,448,505 A | 9/1995 | Novak |
| 5,455,670 A | 10/1995 | Payne et al. |
| 5,500,737 A | 3/1996 | Donaldson et al. |
| 5,532,816 A | 7/1996 | Spann et al. |
| 5,534,992 A | 7/1996 | Takeshima et al. |
| 5,594,169 A | 1/1997 | Field et al. |
| D378,751 S | 4/1997 | Smith |
| 5,671,160 A | 9/1997 | Julian |
| 5,698,784 A | 12/1997 | Hotelling et al. |
| 5,724,264 A | 3/1998 | Rosenberg et al. |
| 5,737,068 A | 4/1998 | Kaneko et al. |
| 5,742,379 A | 4/1998 | Reifer |
| 5,754,284 A | 5/1998 | Leblanc et al. |
| RE35,816 E | 6/1998 | Schulz |
| 5,764,360 A | 6/1998 | Meier |
| 5,767,952 A | 6/1998 | Ohtomo et al. |
| 5,771,623 A | 6/1998 | Pernstich et al. |
| 5,817,243 A | 10/1998 | Shaffer |
| 5,825,350 A | 10/1998 | Case, Jr. et al. |
| 5,828,057 A | 10/1998 | Hertzman et al. |
| 5,861,956 A | 1/1999 | Bridges et al. |
| 5,880,822 A | 3/1999 | Kubo |
| 5,886,775 A | 3/1999 | Houser et al. |
| 5,886,777 A | 3/1999 | Hirunuma |
| 5,892,575 A | 4/1999 | Marino |
| 5,893,214 A | 4/1999 | Meier et al. |
| 5,898,421 A | 4/1999 | Quinn |
| 5,926,388 A | 7/1999 | Kimbrough et al. |
| 5,930,030 A | 7/1999 | Scifres |
| 5,957,559 A | 9/1999 | Rueb et al. |
| 5,973,788 A | 10/1999 | Pettersen et al. |
| 5,991,011 A | 11/1999 | Damm |
| 6,017,125 A | 1/2000 | Vann |
| 6,023,326 A | 2/2000 | Katayama et al. |
| 6,034,722 A | 3/2000 | Viney et al. |
| 6,036,319 A | 3/2000 | Rueb et al. |
| 6,052,190 A | 4/2000 | Sekowski et al. |
| D427,087 S | 6/2000 | Kaneko et al. |
| 6,085,155 A | 7/2000 | Hayase et al. |
| 6,097,491 A | 8/2000 | Hartrumpf |
| 6,097,897 A | 8/2000 | Ide |
| 6,100,540 A | 8/2000 | Ducharme et al. |

(56) References Cited

U.S. PATENT DOCUMENTS

| | | |
|---|---|---|
| 6,111,563 A | 8/2000 | Hines |
| 6,122,058 A | 9/2000 | Van Der Werf et al. |
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |
| 6,369,794 B1 | 4/2002 | Sakurai et al. |
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |
| 6,463,393 B1 | 10/2002 | Giger |
| 6,490,027 B1 | 12/2002 | Rajchel et al. |
| 6,501,543 B2 | 12/2002 | Hedges et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,611,617 B1 | 8/2003 | Crampton |
| 6,624,916 B1 | 9/2003 | Green et al. |
| 6,630,993 B1 | 10/2003 | Hedges et al. |
| 6,633,367 B2 | 10/2003 | Gogolla |
| 6,646,732 B2 | 11/2003 | Ohtomo et al. |
| 6,650,222 B2 | 11/2003 | Darr |
| 6,667,798 B1 | 12/2003 | Markendorf et al. |
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,754,370 B1 | 6/2004 | Hall-Holt et al. |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,253,891 B2 | 8/2007 | Toker et al. |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,336,375 B1 | 2/2008 | Faul et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,429,112 B2 * | 9/2008 | Metcalfe ............. G01N 21/534 359/529 |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 | 11/2009 | Scherch |
| 7,614,019 B2 | 11/2009 | Rimas Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Cramer et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,894,079 B1 | 2/2011 | Altendorf et al. |
| 7,903,237 B1 | 3/2011 | Li |
| 7,929,150 B1 | 4/2011 | Schweiger |
| 7,954,250 B2 | 6/2011 | Crampton |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,212 B2 | 1/2012 | Jelinek |

(56) References Cited

U.S. PATENT DOCUMENTS

| | | |
|---|---|---|
| 8,125,629 B2 | 2/2012 | Dold et al. |
| 8,151,477 B2 | 4/2012 | Tait |
| 8,190,030 B2 | 5/2012 | Leclair et al. |
| 8,217,893 B2 | 7/2012 | Quinn et al. |
| 8,237,934 B1 | 8/2012 | Cooke et al. |
| 8,244,023 B2 | 8/2012 | Yamada |
| 8,279,430 B2 | 10/2012 | Dold et al. |
| 8,314,939 B2 | 11/2012 | Kato et al. |
| 8,320,708 B2 | 11/2012 | Kurzweil et al. |
| 8,360,240 B2 | 1/2013 | Kallabis |
| 8,379,224 B1 | 2/2013 | Piasse et al. |
| 8,387,961 B2 | 3/2013 | Im |
| 8,405,604 B2 | 3/2013 | Pryor et al. |
| 8,422,034 B2 | 4/2013 | Steffensen et al. |
| 8,437,011 B2 | 5/2013 | Steffensen et al. |
| 8,438,747 B2 | 5/2013 | Ferrari |
| 8,467,071 B2 | 6/2013 | Steffey et al. |
| 8,467,072 B2 | 6/2013 | Cramer et al. |
| 8,483,512 B2 | 7/2013 | Moeller |
| 8,509,949 B2 | 8/2013 | Bordyn et al. |
| 8,525,983 B2 | 9/2013 | Bridges et al. |
| 8,537,371 B2 | 9/2013 | Steffensen et al. |
| 8,537,375 B2 | 9/2013 | Steffensen et al. |
| 8,553,212 B2 | 10/2013 | Jaeger et al. |
| 8,593,648 B2 | 11/2013 | Cramer et al. |
| 8,619,265 B2 | 12/2013 | Steffey et al. |
| 8,630,314 B2 | 1/2014 | York |
| 8,638,984 B2 | 1/2014 | Roithmeier |
| 8,654,354 B2 | 2/2014 | Steffensen et al. |
| 8,659,749 B2 | 2/2014 | Bridges |
| 8,670,114 B2 | 3/2014 | Bridges et al. |
| 8,681,317 B2 | 3/2014 | Moser et al. |
| 8,699,756 B2 | 4/2014 | Jensen |
| 8,717,545 B2 | 5/2014 | Sebastian et al. |
| 8,740,396 B2 | 6/2014 | Brown et al. |
| 8,772,719 B2 | 7/2014 | Böckem et al. |
| 8,773,667 B2 | 7/2014 | Edmonds et al. |
| 8,848,203 B2 | 9/2014 | Bridges et al. |
| 8,874,406 B2 | 10/2014 | Rotvold et al. |
| 8,931,183 B2 | 1/2015 | Jonas |
| 2001/0045534 A1 | 11/2001 | Kimura |
| 2002/0033940 A1 | 3/2002 | Hedges et al. |
| 2002/0093646 A1 | 7/2002 | Muraoka et al. |
| 2002/0148133 A1 | 10/2002 | Bridges et al. |
| 2002/0179866 A1 | 12/2002 | Hoeller et al. |
| 2003/0014212 A1 | 1/2003 | Ralston et al. |
| 2003/0020895 A1 | 1/2003 | Bridges |
| 2003/0033041 A1 | 2/2003 | Richey |
| 2003/0035195 A1 | 2/2003 | Blech et al. |
| 2003/0048459 A1 | 3/2003 | Gooch |
| 2003/0066202 A1 | 4/2003 | Eaton |
| 2003/0090682 A1 | 5/2003 | Gooch et al. |
| 2003/0112449 A1 | 6/2003 | Tu et al. |
| 2003/0125901 A1 | 7/2003 | Steffey et al. |
| 2003/0133092 A1 | 7/2003 | Rogers |
| 2003/0179362 A1 | 9/2003 | Osawa et al. |
| 2003/0206285 A1 | 11/2003 | Lau |
| 2003/0227616 A1* | 12/2003 | Bridges ............ G01B 11/002 356/139.06 |
| 2004/0035277 A1 | 2/2004 | Hubbs |
| 2004/0041996 A1 | 3/2004 | Abe |
| 2004/0075823 A1 | 4/2004 | Lewis et al. |
| 2004/0100705 A1* | 5/2004 | Hubbs ............ G02B 7/182 359/819 |
| 2004/0170363 A1 | 9/2004 | Angela |
| 2004/0189944 A1 | 9/2004 | Kaufman et al. |
| 2004/0218104 A1 | 11/2004 | Smith et al. |
| 2004/0223139 A1 | 11/2004 | Vogel |
| 2005/0058179 A1* | 3/2005 | Phipps ............ G01K 1/08 374/208 |
| 2005/0147477 A1 | 7/2005 | Clark |
| 2005/0179890 A1 | 8/2005 | Cramer et al. |
| 2005/0185182 A1 | 8/2005 | Raab et al. |
| 2005/0197145 A1 | 9/2005 | Chae et al. |
| 2005/0254043 A1 | 11/2005 | Chiba |
| 2005/0284937 A1 | 12/2005 | Xi et al. |
| 2006/0009929 A1 | 1/2006 | Boyette, Jr. et al. |
| 2006/0053647 A1 | 3/2006 | Raab et al. |
| 2006/0055662 A1 | 3/2006 | Rimas-Ribikauskas et al. |
| 2006/0055685 A1 | 3/2006 | Rimas-Ribikauskas et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0140473 A1 | 6/2006 | Brooksby et al. |
| 2006/0141435 A1 | 6/2006 | Chiang |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0222237 A1 | 10/2006 | Du et al. |
| 2006/0235611 A1 | 10/2006 | Deaton et al. |
| 2006/0262001 A1 | 11/2006 | Ouchi et al. |
| 2006/0279246 A1 | 12/2006 | Hashimoto et al. |
| 2007/0016386 A1* | 1/2007 | Husted ............ G01C 17/00 702/150 |
| 2007/0019212 A1 | 1/2007 | Gatsios et al. |
| 2007/0024842 A1 | 2/2007 | Nishizawa et al. |
| 2007/0090309 A1 | 4/2007 | Hu et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0236452 A1 | 10/2007 | Venkatesh et al. |
| 2007/0247615 A1 | 10/2007 | Bridges et al. |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0107305 A1 | 5/2008 | Vanderkooy et al. |
| 2008/0122786 A1 | 5/2008 | Pryor et al. |
| 2008/0203299 A1 | 8/2008 | Kozuma et al. |
| 2008/0229592 A1 | 9/2008 | Hinderling et al. |
| 2008/0239281 A1 | 10/2008 | Bridges |
| 2008/0246974 A1 | 10/2008 | Wilson et al. |
| 2008/0250659 A1 | 10/2008 | Bellerose et al. |
| 2008/0279446 A1 | 11/2008 | Hassebrook et al. |
| 2008/0297808 A1 | 12/2008 | Riza et al. |
| 2008/0302200 A1 | 12/2008 | Tobey |
| 2008/0309949 A1 | 12/2008 | Rueb |
| 2008/0316497 A1 | 12/2008 | Taketomi et al. |
| 2008/0316503 A1 | 12/2008 | Smarsh et al. |
| 2009/0000136 A1 | 1/2009 | Crampton |
| 2009/0009747 A1 | 1/2009 | Wolf et al. |
| 2009/0033621 A1 | 2/2009 | Quinn et al. |
| 2009/0046271 A1 | 2/2009 | Constantikes |
| 2009/0066932 A1 | 3/2009 | Bridges et al. |
| 2009/0109426 A1 | 4/2009 | Cramer et al. |
| 2009/0153817 A1 | 6/2009 | Kawakubo |
| 2009/0157226 A1 | 6/2009 | De Smet |
| 2009/0171618 A1 | 7/2009 | Kumagai et al. |
| 2009/0187373 A1 | 7/2009 | Atwell et al. |
| 2009/0190125 A1 | 7/2009 | Foster et al. |
| 2009/0205088 A1 | 8/2009 | Crampton et al. |
| 2009/0213073 A1 | 8/2009 | Obermeyer et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2009/0244277 A1 | 10/2009 | Nagashima et al. |
| 2009/0260240 A1 | 10/2009 | Bernhard |
| 2010/0008543 A1 | 1/2010 | Yamada et al. |
| 2010/0025746 A1 | 2/2010 | Chapman et al. |
| 2010/0058252 A1 | 3/2010 | Ko |
| 2010/0091112 A1 | 4/2010 | Veeser et al. |
| 2010/0103431 A1 | 4/2010 | Demopoulos |
| 2010/0128259 A1 | 5/2010 | Bridges et al. |
| 2010/0142798 A1 | 6/2010 | Weston et al. |
| 2010/0149518 A1 | 6/2010 | Nordenfelt et al. |
| 2010/0149525 A1 | 6/2010 | Lau |
| 2010/0158361 A1 | 6/2010 | Grafinger et al. |
| 2010/0176270 A1 | 7/2010 | Lau et al. |
| 2010/0207938 A1 | 8/2010 | Yau et al. |
| 2010/0225746 A1 | 9/2010 | Shpunt et al. |

(56) References Cited

U.S. PATENT DOCUMENTS

| | | |
|---|---|---|
| 2010/0234094 A1 | 9/2010 | Gagner et al. |
| 2010/0235786 A1 | 9/2010 | Maizels et al. |
| 2010/0245851 A1 | 9/2010 | Teodorescu |
| 2010/0250175 A1 | 9/2010 | Briggs et al. |
| 2010/0250188 A1 | 9/2010 | Brown |
| 2010/0251148 A1 | 9/2010 | Brown |
| 2010/0265316 A1 | 10/2010 | Sali et al. |
| 2010/0277747 A1 | 11/2010 | Rueb et al. |
| 2010/0284082 A1 | 11/2010 | Shpunt et al. |
| 2010/0299103 A1 | 11/2010 | Yoshikawa |
| 2011/0001958 A1 | 1/2011 | Bridges et al. |
| 2011/0003507 A1 | 1/2011 | Van Swearingen et al. |
| 2011/0007154 A1 | 1/2011 | Vogel et al. |
| 2011/0013281 A1 | 1/2011 | Mimura et al. |
| 2011/0023578 A1 | 2/2011 | Grasser |
| 2011/0025827 A1 | 2/2011 | Shpunt et al. |
| 2011/0032509 A1 | 2/2011 | Bridges et al. |
| 2011/0035952 A1 | 2/2011 | Roithmeier |
| 2011/0043620 A1 | 2/2011 | Svanholm et al. |
| 2011/0043808 A1 | 2/2011 | Isozaki et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0109502 A1 | 5/2011 | Sullivan |
| 2011/0112786 A1 | 5/2011 | Desforges et al. |
| 2011/0123097 A1 | 5/2011 | Van Coppenolle et al. |
| 2011/0128625 A1* | 6/2011 | Larsen .................. B82Y 20/00 |
| | | 359/530 |
| 2011/0166824 A1 | 7/2011 | Haisty et al. |
| 2011/0169924 A1 | 7/2011 | Haisty et al. |
| 2011/0170534 A1 | 7/2011 | York |
| 2011/0173827 A1 | 7/2011 | Bailey et al. |
| 2011/0175745 A1 | 7/2011 | Atwell et al. |
| 2011/0176145 A1 | 7/2011 | Edmonds et al. |
| 2011/0179281 A1 | 7/2011 | Chevallier-Mames et al. |
| 2011/0181872 A1 | 7/2011 | Dold et al. |
| 2011/0260033 A1 | 10/2011 | Steffensen et al. |
| 2011/0301902 A1 | 12/2011 | Panagas et al. |
| 2012/0050255 A1 | 3/2012 | Thomas et al. |
| 2012/0062706 A1 | 3/2012 | Keshavmurthy et al. |
| 2012/0065928 A1 | 3/2012 | Rotvold et al. |
| 2012/0099117 A1 | 4/2012 | Hanchett et al. |
| 2012/0105821 A1 | 5/2012 | Moser et al. |
| 2012/0120391 A1 | 5/2012 | Dold et al. |
| 2012/0120415 A1 | 5/2012 | Steffensen et al. |
| 2012/0124850 A1 | 5/2012 | Ortleb et al. |
| 2012/0154577 A1 | 6/2012 | Yoshikawa et al. |
| 2012/0188559 A1 | 7/2012 | Becker et al. |
| 2012/0206716 A1 | 8/2012 | Cramer et al. |
| 2012/0206808 A1 | 8/2012 | Brown et al. |
| 2012/0218563 A1 | 8/2012 | Spruck et al. |
| 2012/0236320 A1 | 9/2012 | Steffey et al. |
| 2012/0242795 A1 | 9/2012 | Kane et al. |
| 2012/0262550 A1 | 10/2012 | Bridges |
| 2012/0262573 A1 | 10/2012 | Bridges |
| 2012/0262728 A1 | 10/2012 | Bridges et al. |
| 2012/0265479 A1 | 10/2012 | Bridges et al. |
| 2012/0317826 A1 | 12/2012 | Jonas |
| 2013/0037694 A1 | 2/2013 | Steffensen et al. |
| 2013/0096873 A1 | 4/2013 | Rosengaus et al. |
| 2013/0100282 A1 | 4/2013 | Siercks et al. |
| 2013/0128284 A1 | 5/2013 | Steffey et al. |
| 2013/0155386 A1 | 6/2013 | Bridges et al. |
| 2013/0162469 A1 | 6/2013 | Zogg et al. |
| 2013/0197852 A1 | 8/2013 | Grau et al. |
| 2013/0201470 A1 | 8/2013 | Cramer et al. |
| 2013/0293684 A1 | 11/2013 | Becker et al. |
| 2014/0002806 A1 | 1/2014 | Buchel et al. |
| 2014/0028805 A1 | 1/2014 | Tohme et al. |
| 2014/0267629 A1 | 9/2014 | Tohme et al. |
| 2014/0320643 A1 | 10/2014 | Markendorf |
| 2015/0331159 A1 | 11/2015 | Bridges et al. |

FOREIGN PATENT DOCUMENTS

| | | |
|---|---|---|
| CN | 1263807 A | 8/2000 |
| CN | 1290850 | 4/2001 |
| CN | 1290850 A | 4/2001 |
| CN | 1362692 | 8/2002 |
| CN | 1362692 A | 8/2002 |
| CN | 1474159 A | 2/2004 |
| CN | 1531659 A | 9/2004 |
| CN | 1608212 A | 4/2005 |
| CN | 1926400 A | 3/2007 |
| CN | 101203730 A | 6/2008 |
| CN | 101297176 A | 10/2008 |
| CN | 101371160 A | 2/2009 |
| CN | 101427155 A | 5/2009 |
| CN | 101750012 A | 6/2010 |
| CN | 101776982 A | 7/2010 |
| CN | 201548192 U | 8/2010 |
| DE | 7704949 U1 | 6/1977 |
| DE | 3530922 A1 | 8/1984 |
| DE | 3827458 A1 | 2/1990 |
| DE | 10022054 A1 | 11/2001 |
| DE | 10160090 A1 | 7/2002 |
| DE | 202004004945 U1 | 10/2004 |
| DE | 102004024171 A1 | 9/2005 |
| DE | 102005019058 A1 | 12/2005 |
| DE | 202006020299 U1 | 5/2008 |
| DE | 102007058692 A1 | 6/2009 |
| DE | 102009040837 A1 | 3/2011 |
| EP | 0598523 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |
| EP | 1519141 | 3/2005 |
| EP | 1607767 A1 | 12/2005 |
| EP | 2136178 A1 | 12/2009 |
| EP | 2177868 A2 | 4/2010 |
| EP | 2259013 A1 | 12/2010 |
| EP | 2322901 A1 | 5/2011 |
| GB | 1543636 | 4/1979 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | 6097288 | 7/1990 |
| JP | H0331715 A | 2/1991 |
| JP | H0371116 A | 3/1991 |
| JP | H0465631 A | 3/1992 |
| JP | H05257005 | 10/1993 |
| JP | H05302976 A | 11/1993 |
| JP | H06214186 | 8/1994 |
| JP | H06229715 A | 8/1994 |
| JP | H0665818 | 9/1994 |
| JP | H06265355 A | 9/1994 |
| JP | H074967 A | 1/1995 |
| JP | H09113223 | 5/1997 |
| JP | H102722 A | 1/1998 |
| JP | H10107357 A | 4/1998 |
| JP | H11304465 A | 11/1999 |
| JP | 2000503476 A | 3/2000 |
| JP | 2000275042 | 10/2000 |
| JP | 2000346645 A | 12/2000 |
| JP | 2001013247 A | 1/2001 |
| JP | 2001165662 A | 6/2001 |
| JP | 2001513204 A | 8/2001 |
| JP | 2001272468 | 10/2001 |
| JP | 2001284317 A | 10/2001 |
| JP | 2001353112 A | 12/2001 |
| JP | 2002089184 A | 3/2002 |
| JP | 2002098762 A | 4/2002 |
| JP | 2002139310 A | 5/2002 |
| JP | 2002209361 A | 7/2002 |
| JP | 2003506691 A | 2/2003 |
| JP | 2004508954 A | 3/2004 |
| JP | 2004108939 | 4/2004 |
| JP | 2005010585 | 1/2005 |

(56) References Cited

FOREIGN PATENT DOCUMENTS

| | | |
|---|---|---|
| JP | 2005265700 A | 9/2005 |
| JP | 2006003127 A | 1/2006 |
| JP | 2006058091 A | 3/2006 |
| JP | 2006084460 A | 3/2006 |
| JP | 2006220514 A | 8/2006 |
| JP | 2006276012 A | 10/2006 |
| JP | 2006526844 A | 11/2006 |
| JP | 2007165331 A | 6/2007 |
| JP | 2007256872 A | 10/2007 |
| JP | 2008027308 A | 2/2008 |
| JP | 2009014639 A | 1/2009 |
| JP | 2009134761 A | 6/2009 |
| JP | 2009229350 A | 10/2009 |
| JP | 2010169633 A | 8/2010 |
| JP | 2011158371 A | 8/2011 |
| JP | 2011526706 A | 10/2011 |
| JP | H04504468 A | 10/2011 |
| TW | 381361 B | 2/2000 |
| WO | 9012284 | 10/1990 |
| WO | 9534849 A1 | 12/1995 |
| WO | 0109642 A1 | 2/2001 |
| WO | 0177613 A1 | 10/2001 |
| WO | 0223121 A1 | 3/2002 |
| WO | 0237466 A1 | 5/2002 |
| WO | 02084327 A2 | 10/2002 |
| WO | 03062744 A1 | 7/2003 |
| WO | 03073121 A1 | 9/2003 |
| WO | 2004063668 | 7/2004 |
| WO | 2005026772 A2 | 3/2005 |
| WO | 2006039682 A1 | 4/2006 |
| WO | 2006052259 A1 | 5/2006 |
| WO | 2006055770 A2 | 5/2006 |
| WO | 2007123604 A1 | 11/2007 |
| WO | 2007124010 A2 | 11/2007 |
| WO | 2008121919 A1 | 10/2008 |
| WO | 2010107434 A1 | 9/2010 |
| WO | 2011112277 A1 | 9/2011 |
| WO | 2012142074 A2 | 10/2012 |
| WO | 2014143644 A1 | 9/2014 |
| WO | 2014149701 A1 | 9/2014 |
| WO | 2014149704 A1 | 9/2014 |
| WO | 2014149705 A1 | 9/2014 |
| WO | 2014149706 A1 | 9/2014 |
| WO | 2014149702 A1 | 9/2015 |

OTHER PUBLICATIONS

"DLP-Based Structured Light 3D Imaging Technologies and Applications" by J. Geng; Proceedings of SPIE, vol. 7932. Published Feb. 11, 2011, 15 pages.

Chinese Office Action for Application No. 201280011149.9; Issued Dec. 25, 2014; pp. 1-9.

Combined Search and Examination Report for Application No. GB1421763.2; Issued Jan. 14, 2014; pp. 1-7.

Combined Search and Examination Report for Application No. GB1421764.0; Issued Jan. 14, 2014; pp. 1-5.

Combined Search and Examination Report for Application No. GB1421780.6; Issued Jan. 30, 2015; pp. 6.

Combined Search and Examination Report for Application No. GB1421783.0; Issued Jan. 23, 2015; pp. 10.

Final Office Action for U.S. Appl. No. 13/832,658, dated Mar. 17, 2015 56 pages.

Japanese Office Action for Application No. 2013556822; Issued Feb. 17, 2015; pp. 5.

2x2 High Speed Lithium Niobate Interferometric Switch; [on-line]; JDS Uniphase Corporation; 2007; Retreived from www.jdsu.com.

AO Modulator—M040-8J-FxS; [online—technical data sheet]; Gooch & Housego; Nov. 2006; Retrieved from http://www.goochandhousego.com/.

Automated Precision, Inc., Product Specifications, Radian, Featuring Innovo Technology, info@apisensor.com, Copyright 2011, 2 pages.

Cao, et al.; "VisionWand: Interaction Techniques for Large Displays using a Passive Wand Tracked in 3D"; Proceedings of the 16th Annual ACM Symposium on User Interface Software and Technology, UIST; vol. 5, issue 2; pp. 173-182; Jan. 2003.

Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131.

Computer Giants Embrace On-Chip Optics; Mar. 27, 2008; [on-line]; Optics.org; [Retreived on Apr. 2, 2008]; Retreived from http://optics.org/cws/article/research/33521.

Cuypers, et al "Optical Measurement Techniques for Mobile and Large-Scale Dimensional Metrology" (2009) ; Optics and Lasers in Engineering pp. 292-300; vol. 47; Elsevier Ltd. XP 25914917A.

EOSpace—High-Speed Switches; [on-line technical brochure]; [Retrieved May 18, 2009]; Retrieved from http://www.cospace.com/Switches.htm.

FARO Laser Tracker ION; 2 pages; revised Apr. 23, 2010; FARO Technologies, Inc., www.lasertracker.faro.com.

FARO Technical Institute, Basic Measurement Training Workbook, Version 1.0, FARO Laster Tracker, Jan. 2008, Students Book, FAO CAM2 Measure.

Hanwei Xiong et al: "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.

Hecht, Jeff, Photonic Frontiers: Gesture Recognition: Lasers Bring Gesture Recognition to the Home, Laser Focus World, pp. 1-5, [Retrieved On-Line Mar. 3, 2011], http://www.optoiq.com/optoiq-2/en-us/index/photonics-technologies-applications/lfw-display/lfw.

Hui, Elliot E., et al, "Single-Step Assembly of Complex 3-D Microstructures", Jan. 23, 2000, IEEE; pp. 602-607.

Integrated Optical Amplitude Modulator; [on-line technical data sheet]; [RetrievedOct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open.

Kollorz, et al., "Gesture recognition with a time-of-flight camera", International Journal of Intelligent Systems Technologies and Applications, vol. 5, No. 3/4, pp. 334-343, [Retreived Aug. 11, 2011; http://www5.informatik.uni-erlangen.de/Forschung/Publikat.

LaserTRACER-measureing sub-micron in space; http://www.etalon-ag.com/index.php/en/products/lasertracer; 4 pages; Jun. 28, 2011; ETALON AG.

Leica Geosystems AG ED—"Leica Laser Tracker System", Internet Citation, Jun. 28, 2012, XP002678836, Retrieved from the Internet: URL:http://www.a-solution.com.au/pages/downloads/LTD500_Brochure_EN.pdf.

Leica Geosystems Metrology, "Leica Absolute Tracker AT401, White Paper," Hexagon AB; 2010.

Leica Geosystems: "TPS1100 Professional Series", 1999, Retrieved from the Internet: URL:http://www.estig.ipbeja.pt/~legvm/top_civil/TPS1100%20-%20A%20New%20Generation%20of%20Total%20Stations.pdf, [Retrieved on Jul. 2012].

Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).

Lightvision—High Speed Variable Optical Attenuators (VOA); [on-line]; A publication of Lightwaves 2020, Feb. 1, 2008; Retrieved from http://www.lightwaves2020.com/home/.

Maekynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, vol. 43, No.

Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptica.

Matsumaru, K., "Mobile Robot with Preliminary-Announcement and Display Function of Forthcoming Motion Using Projection

(56) References Cited

OTHER PUBLICATIONS

Equipment," Robot and Human Interactive Communication, 2006. RO-MAN06. The 15th IEEE International Symposium, pp. 443-450, Sep. 6-8.
MEMS Variable Optical Attenuators Single/Multi-Channel; [on-line]; Jan. 17, 2005; Retrieved from www.ozoptics.com.
Nanona High Speed & Low Loss Optical Switch; [on-line technical data sheet]; [Retrieved Oct. 14, 2010]; Retrieved from http://www.bostonati.com/products/PI-FOS.pdf.
New River Kinematics, SA ARM—"The Ultimate Measurement Software for Arms, Software Release!", SA Sep. 30, 2010, [Online], http://www.kinematics.com/news/software-release-sa20100930.html (1 of 14), [Retrieved Apr. 13, 2011 11:40:47 AM].
Optical Circulator (3-Ports & 4-Ports); [on-line technical data sheet]; Alliance Fiber Optic Products, Inc. REV.D Jan. 15, 2004; Retrieved from www.afop.com.
Optical Circulators Improve Bidirectional Fiber Systems; by Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirecti.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517.
Parker, et al "Instrument for Setting Radio Telescope Surfaces" (4 pp) XP 55055817A.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2.
Poujouly, Stephane, et al., Digital Laser Range Finder: Phase-Shift Estimation by Undersampling Technique; IEEE, Copyright 1999.
Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Novembe.
RS Series Remote Controlled Optical Switch; [on-line technical data sheet]; Sercalo Microtechnology, Ltd. [Retrieved Oct. 14, 2010]; Retreived from http://www.sercalo.com/document/PDFs/DataSheets/RS%20datasheet.pdf.
Sladek, J., et al: "The Hybrid Contact-Optical Coordinate Measuring System." Measurement, vol. 44, No. 3, Mar. 1, 2011, pp. 503-510.
Stone, et al. "Automated Part Tracking on the Construction Job Site" 8 pp; XP 55055816A; National Institute of Standards and Technology.
Super-Nyquist Operation of the AD9912 Yields a High RF Output Signal; Analog Devices, Inc., AN-939 Application Note; www.analog.com; Copyright 2007.
Tracker3; Ultra-Portable Laser Tracking System; 4 pages; 2010 Automated Precision Inc.; www.apisensor.com.
Turk, et al., "Perceptual Interfaces", UCSB Technical Report 2003-33, pp. 1-43 [Retreived Aug. 11, 2011, http://www.cs.ucsb.edu/research/tech_reports/reports/2003-33.pdf] (2003).
Burge, James H., et al, Use of a commerical laser tracker for optical alignment, Proc, of SPIE vol. 6676, Sep. 21, 2007, pp. 66760E-1-6 6760E-12.
Chen, Jihua, et al, Research on the Principle of 5/6-DOF Laser Tracking Metrology, Journal of Astronautic Metrology and Measurement vol. 27, No. 3, May 31, 2007, pp. 58-62.
Non-Final Office Action of U.S. Appl. No. 13/832,658 dated Jul. 14, 2015; 73 pages.
NonFinal Office Action for U.S. Appl. No. 14/541,607 dated Sep. 15, 2015; 67 pages.
Newport Company "Fiber Optic Scribes" https://web.archive.org/web/20120903063012/http://www.newport.com/Fiber-Optic-Scribes/835171/1033/info.aspx; 2012, 2 pages.
Newport Corporation "Projects in Fiber Optics: Applications Handbook", 1986; 3 pages.
Takeuchi et al., "Ultraprecision 3D Micromachining of Glass"; Annals of the CIRP; Jan. 4, 1996; vol. 45; 401-404 pages.
Thorlabs "Ruby Dualscribe Fiber Optic Scribe" a Mechanical Drawing, 2014, 1 page.

* cited by examiner

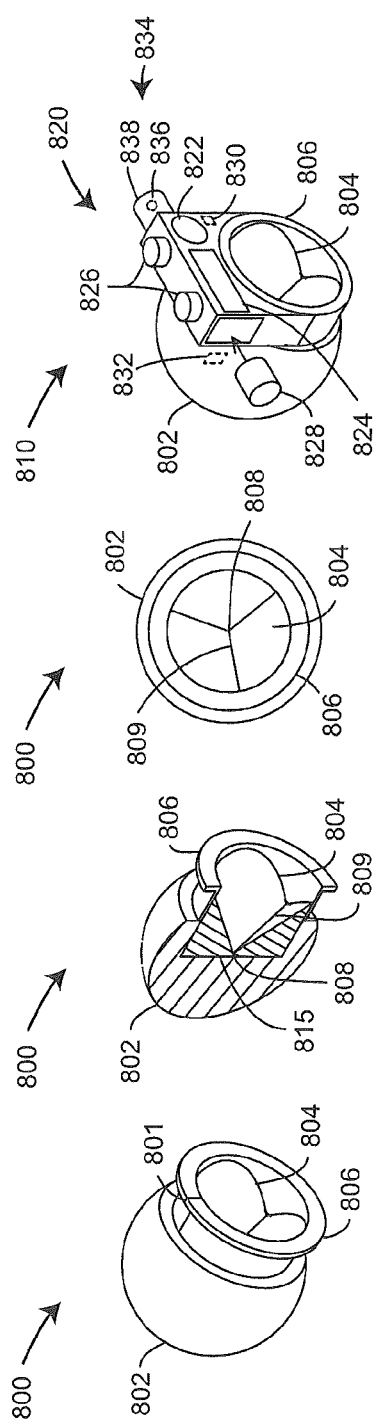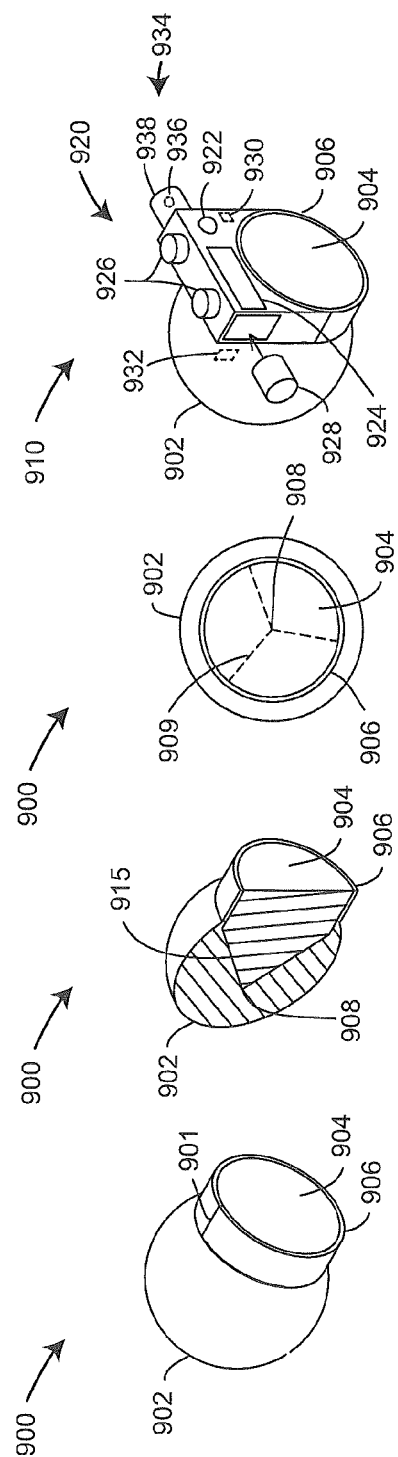

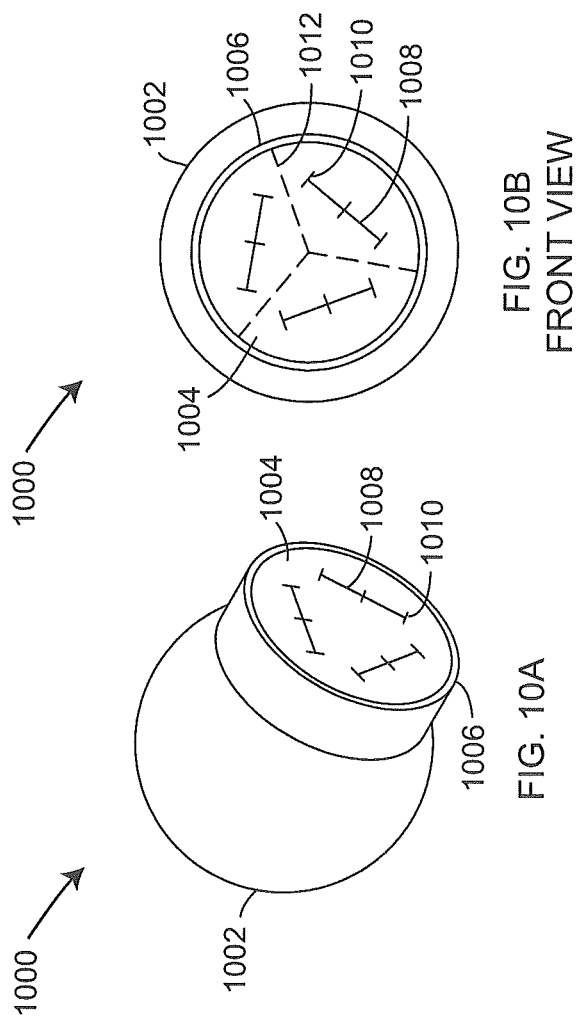

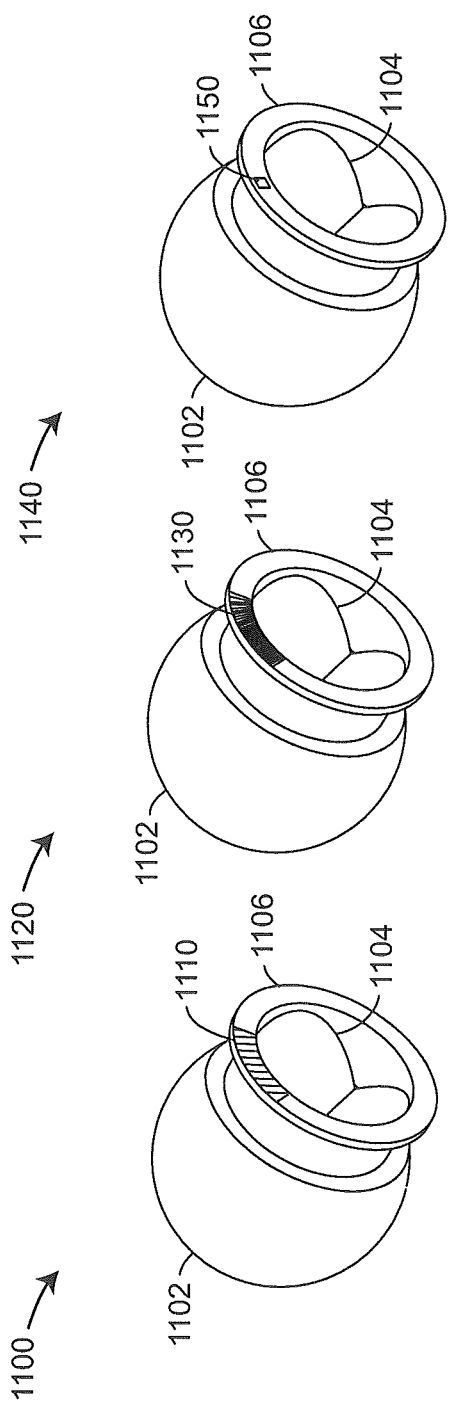

FRONT VIEW

SIDE SECTION VIEW

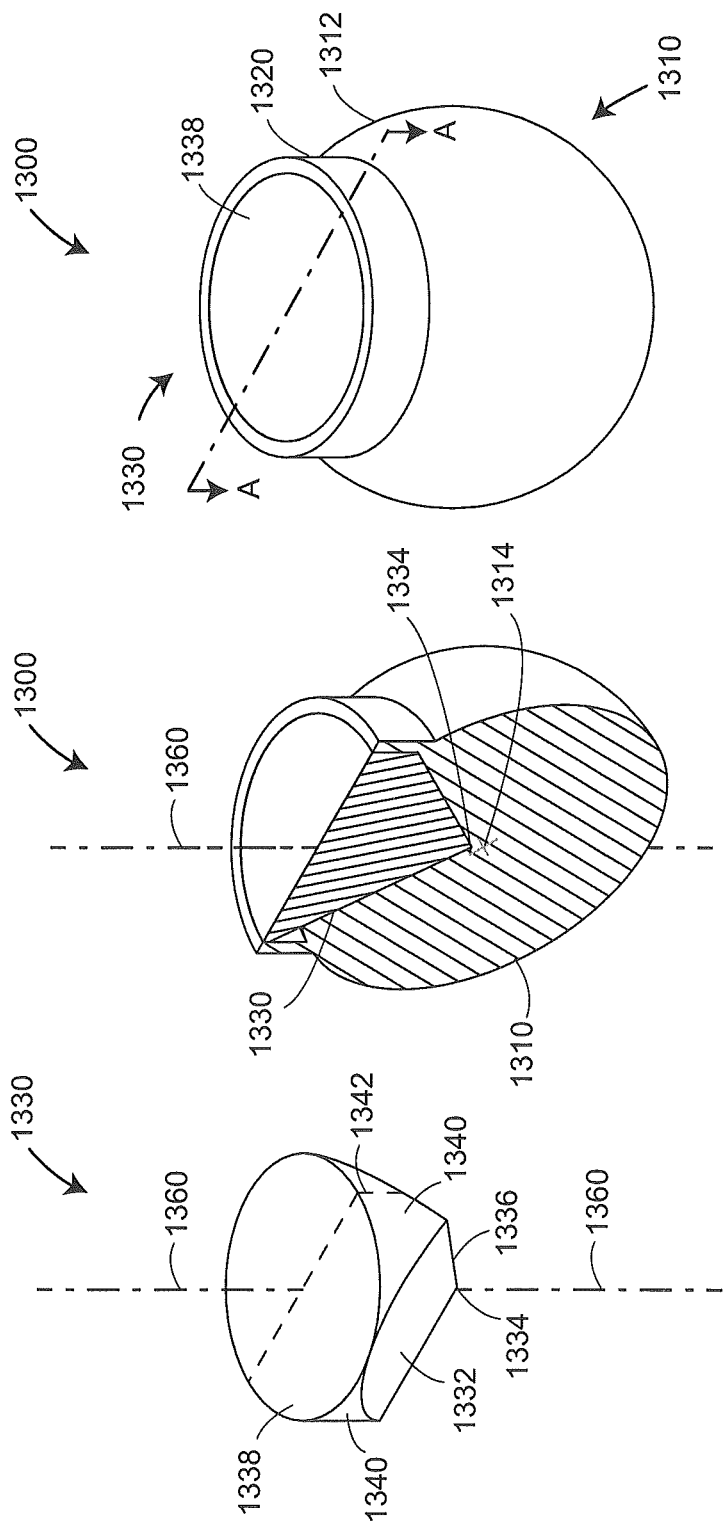

CROSS SECTION A-A

CROSS SECTION A-A

MEASUREMENT SYSTEM HAVING AIR TEMPERATURE COMPENSATION BETWEEN A TARGET AND A LASER TRACKER

CROSS-REFERENCE TO RELATED APPLICATIONS

The present application is a divisional application of U.S. patent application Ser. No. 13/832,658 filed Mar. 15, 2013, which is a continuation application of U.S. patent application Ser. No. 13/407,983 filed Feb. 29, 2012, which claims the benefit of provisional application No. 61/448,823 filed Mar. 3, 2011, and also further claims the benefit of provisional application No. 61/475,703 filed Apr. 15, 2011 and provisional application No. 61/592,049 filed Jan. 30, 2012, the entire contents of both of which are hereby incorporated by reference. The U.S. patent Ser. No. 13/407,983 is also a continuation in part of U.S. patent application Ser. No. 13/370,339 filed Feb. 10, 2012, which claims priority to provisional application No. 61/442,452 filed Feb. 14, 2011, the entire contents of which are hereby incorporated by reference. U.S. patent application Ser. No. 13/832,658 is further a continuation in part of U.S. patent application Ser. No. 12/620,070 filed Nov. 17, 2009, which claims benefit of provisional application No. 61/115,136 filed Nov. 17, 2008, the entire contents of which are hereby incorporated by reference.

FIELD OF INVENTION

The present invention relates in general to methods for measuring targets and in particular to methods for measuring the center of a spherical target containing a retroreflector.

BACKGROUND

There is a class of instruments that measures the coordinates of a point by sending a laser beam to a retroreflector target in contact with the point. The instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. There is another category of instruments known as total stations or tachymeters that may measure a retroreflector or a point on a diffusely scattering surface. Laser trackers, which typically have accuracies on the order of a thousand of an inch and as good as one or two micrometers under certain circumstances, are usually much more accurate than total stations. The broad definition of laser tracker, which includes total stations, is used throughout this application.

Ordinarily the laser tracker sends a laser beam to a retroreflector target. A common type of retroreflector target is the spherically mounted retroreflector (SMR), which includes a cube-corner retroreflector embedded within a metal sphere. The cube-corner retroreflector includes three mutually perpendicular mirrors. The vertex, which is the common point of intersection of the three mirrors, is located near the center of the sphere. Because of this placement of the cube corner within the sphere, the perpendicular distance from the vertex to any surface on which the SMR rests remains nearly constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

Some laser trackers have the ability to measure six degrees of freedom (DOF), which may include three translations, such as x, y, and z, and three rotations, such as pitch, roll, and yaw. An exemplary six-DOF laser tracker system is described in U.S. Pat. No. 7,800,758 ('758) to Bridges, et al., incorporated by reference herein. The '758 patent discloses a probe that holds a cube corner retroreflector, onto which marks have been placed. The cube corner retroreflector is illuminated by a laser beam from the laser tracker, and the marks on the cube corner retroreflector are captured by an orientation camera within the laser tracker. The three orientational degrees of freedom, for example, the pitch, roll and yaw angles, are calculated based on the image obtained by the orientation camera. The laser tracker measures a distance and two angles to the vertex of the cube-corner retroreflector. When the distance and two angles, which give three translational degrees of freedom of the vertex, are combined with the three orientational degrees of freedom obtained from the orientation camera image, the position of a probe tip, arranged at a prescribed position relative to the vertex of the cube corner retroreflector, can be found. Such a probe tip may be used, for example, to measure the coordinates of a "hidden" feature that is out of the line of sight of the laser beam from the laser tracker.

As explained hereinabove, the vertex of a cube corner retroreflector within an SMR is ideally placed at the exact center of the sphere into which the cube corner is embedded. In practice, the position of the vertex is off the center of the sphere by up to a few thousandths of an inch. In many cases, the difference in the positions of the vertex and the sphere center are known to high accuracy, but this data is not used to correct the tracker readings because the orientation of the SMR is not known. In the accurate measurements made with laser trackers, this error in the centering of the cube corner retroreflector in the sphere is sometimes larger than the errors from the distance and angle meters within the laser tracker. Consequently, there is a need for a method to correct this centering error.

Most of the SMRs in use today contain open-air cube corner retroreflectors. There are some SMRs that use glass cube corner retroreflectors, but these have limited accuracy. Because of the bending of the light entering such glass cube corners, the light appears to travel in a direction that is not the true direction within the cube corner. The error this produces can be minimized by moving the vertex of the cube corner behind the center of the sphere. An example of the calculations involved in minimizing this error is given in U.S. Pat. No. 7,388,654 to Raab, et al., the contents of which are incorporated by reference. However, there is no one distance of movement that eliminates the tracker errors in using such a retroreflector over the full range of angles of incidence over which light can enter the cube corner. As a result, SMRs made with glass cube corners tend to be made very small, as this reduces error, and they tend to be used in applications where the highest accuracy is not required. However, SMRs made with glass cube corners have a significant advantage compared to SMRs made with open-air cube corners: they have a wider acceptance angle. In other words, the light may enter a glass cube corner at a larger angle of incidence without being clipped than an open-air cube corner. Consequently, there is a need for a method of measuring a relatively large SMR containing a glass cube corner with high accuracy. The need is essentially one of finding the center of the SMR spherical surface, regardless of the position of the glass cube corner, and in this respect it is similar to the need described above for SMRs containing open-air cube corners.

More generally, there is a need for a method of finding the center of a target having a spherical surface and containing a retroreflector, regardless of the type of retroreflector. For example, a different type of retroreflector put into spherical surfaces is the cateye retroreflector. Another example is the photogrammetric dot—a small circle of reflective material—which is sometimes centered in a sphere. There are errors in the centering of cateye retroreflectors and photogrammetric dots in spheres, just as in centering cube corner retroreflectors in spheres. Hence there is a general need for a method of finding the center of a target having a spherical surface and containing a retroreflector.

SUMMARY

According to an embodiment of the present invention, a target is provided having a retroreflector. A body is provided having a spherical exterior portion, the body containing a cavity. The cavity is sized to hold the retroreflector, the cavity open to the exterior of the body and having at least one surface opposite the opening, the retroreflector at least partially disposed in the cavity, wherein the retroreflector and at least one surface define a space therebetween. A transmitter is configured to emit an electromagnetic signal. A first actuator is configured to initiate emission of the electromagnetic signal, wherein the transmitter and the first actuator are affixed to the body.

According to another embodiment, a target is provided. The target including a body and a contact element having a region of spherical curvature. A retroreflector is provided. A transmitter is configured to emit an electromagnetic signal. A temperature sensor is configured to measure an air temperature and configured to send the measured air temperature to the transmitter, wherein the contact element, the retroreflector, the transmitter, and the temperature sensor are affixed to the body.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIGS. 8A-C are perspective, cross-sectional, and front views, respectively, of a target that includes an open-air cube-corner slug embedded within a sphere according to embodiments;

FIG. 8D is a perspective view of the target of FIGS. 8A-C with additional features according to an embodiment;

FIGS. 9A-C are perspective, cross-sectional, and front views, respectively, of a target that includes a glass cube-corner embedded within a sphere according to embodiments;

FIG. 9D is a perspective view of the target of FIGS. 9A-C with additional features according to an embodiment;

FIGS. 10A-B are perspective and front views, respectively, of the target of FIGS. 9A-C to which have been added marks on the top surface of the glass prism according to an embodiment;

FIGS. 11A-C are perspective views of the target of FIGS. 8A-C to which have been added a reflective region, a bar-code pattern, and an RF identification tag, respectively, according to embodiments;

FIGS. 13A-C show a perspective view of a glass cube corner, a sectional view of a spherical six-DOF target, and a perspective view of a spherical six-DOF target, respectively, according to an embodiment;

DETAILED DESCRIPTION OF THE PREFERRED EMBODIMENTS

Figure 1:
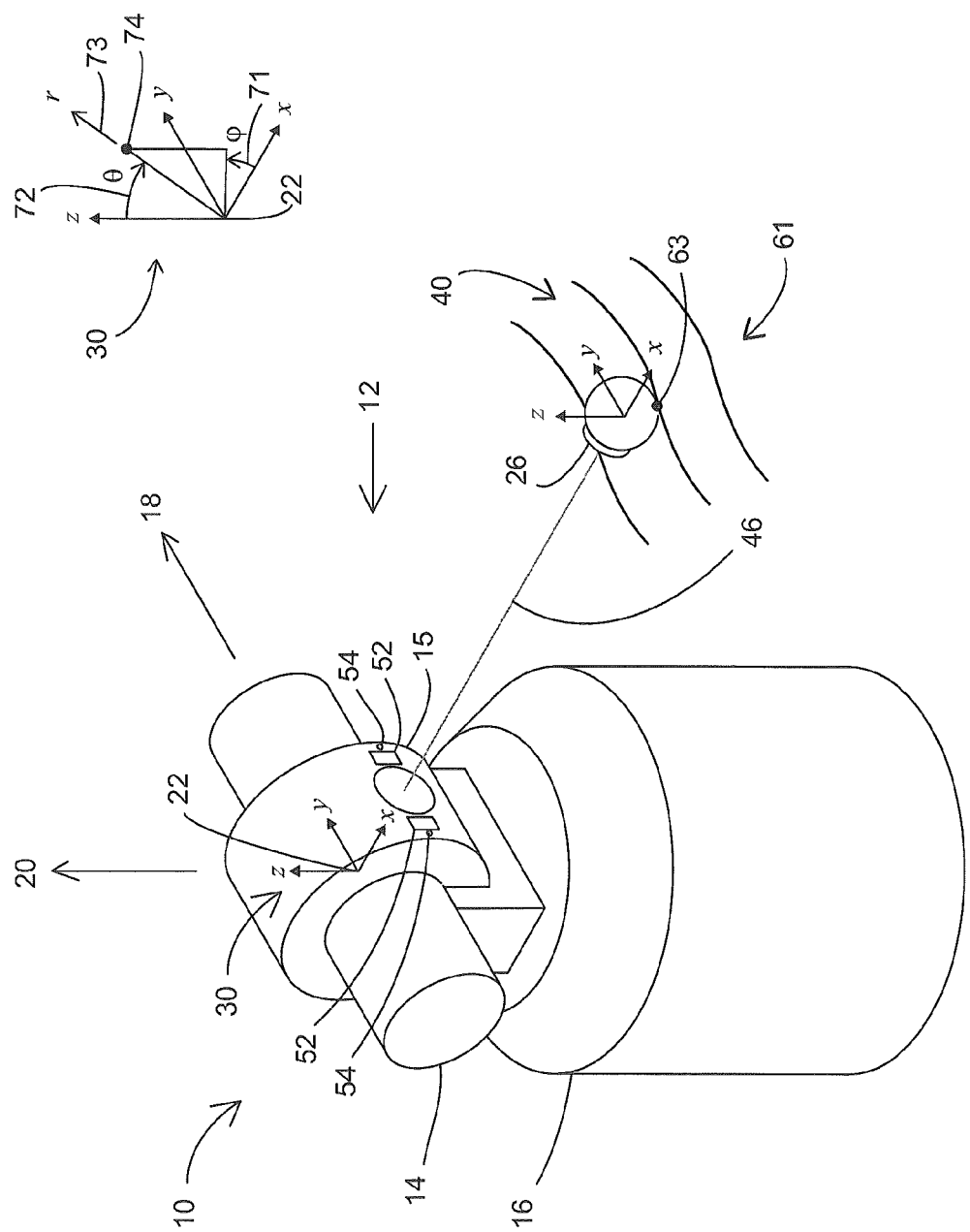
FIG. 1 is a perspective view of a laser tracker and an SMR according to an embodiment.

An exemplary laser tracker 10 is illustrated in FIG. 1. An exemplary gimbaled beam-steering mechanism 12 of laser tracker 10 includes zenith carriage 14 mounted on azimuth base 16 and rotated about azimuth axis 20. Payload 15 is mounted on zenith carriage 14 and rotated about zenith axis 18. Zenith mechanical rotation axis (not shown) and azimuth mechanical rotation axis (not shown) intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in a plane normal to zenith axis 18. Laser beam 46 is pointed in the desired direction by motors within the tracker (not shown) that rotate payload 15 about zenith axis 18 and azimuth axis 20. Zenith and azimuth angular encoders, internal to the tracker (not shown), are attached to zenith mechanical axis (not shown) and azimuth mechanical axis (not shown) and indicate, to relatively high accuracy, the angles of rotation. Laser beam 46 travels to external retroreflector 26 such as the spherically mounted retroreflector (SMR) described above. By measuring the radial distance between gimbal point 22 and retroreflector 26 and the rotation angles about the zenith and azimuth axes 18, 20, the position of retroreflector 26 is found within the spherical coordinate system of the tracker.

The laser tracker 10 is a device that has a device frame of reference 30. The device frame of reference may have as its origin the gimbal point 22. The frame of reference may be fixed with respect to the azimuth base 16, which is typically stationary with respect to the surroundings. The device frame of reference may be represented by a variety of coordinate systems. One type of coordinate system is a Cartesian coordinate system having three perpendicular axes x, y, and z. Another type of coordinate system is a spherical coordinate system. A point 74 within a spherical coordinate 30 may be represented in a spherical coordinate system by one radial distance 73 (r), a first (zenith) angle 72 ($\theta$), and a second (azimuth) angle 71 ($\phi$). The angle $\theta$ is obtained by using the projection of the point 74 onto the z axis. The angle $\phi$ is obtained by using the projection of the point 74 onto the x-y plane. The laser tracker 10 inherently makes measurements in a spherical coordinate system, but a point measured in spherical coordinates may be easily converted to Cartesian coordinates.

The target 26 has a target frame of reference 40. The target frame of reference may be represented, for example, using Cartesian coordinates x, y, and z. The x, y, and z axes of the target frame of reference 40 move with the target 26 and are not necessarily parallel to the corresponding device axes x, y, and z of the device frame of reference 30. The target 26 may be placed in contact with the workpiece surface 61 at a point 63. To find the three-dimensional (3D) coordinates of the point 63, the tracker first determines the center of the target 26 using the distance and two angles it has measured. It may also be used to account for a vector offset of the retroreflector reference point (e.g., cube-corner vertex) with respect to the center of the spherical contact surface of the target 26 using methods described herein below. To move from the center of the target to the surface of the workpiece the position of the center point is offset by an amount equal to the radius of the spherical target surface. In an embodiment, the direction of the offset is found by measuring several points near to the contact point 63 to determine the surface normal at the point 63.

Laser beam 46 may include one or more laser wavelengths. For the sake of clarity and simplicity, a steering mechanism of the sort shown in FIG. 1 is assumed in the following discussion. However, other types of steering mechanisms are possible. For example, it would be possible to reflect a laser beam off a mirror rotated about the azimuth and zenith axes. The techniques described here are applicable, regardless of the type of steering mechanism.

In exemplary laser tracker 10, locator cameras 52 and light sources 54 are located on payload 15. Light sources 54 illuminate one or more retroreflector targets 26. In an embodiment, light sources 54 are LEDs electrically driven to repetitively emit pulsed light. Each locator camera 52 includes a photosensitive array and a lens placed in front of the photosensitive array. The photosensitive array may be a CMOS or CCD array, for example. In an embodiment, the lens has a relatively wide field of view, for example, 30 or 40 degrees. The purpose of the lens is to form an image on the photosensitive array of objects within the field of view of the lens. Usually at least one light source 54 is placed near locator camera 52 so that light from light source 54 is reflected off each retroreflector target 26 onto locator camera 52. In this way, retroreflector images are readily distinguished from the background on the photosensitive array as their image spots are brighter than background objects and are pulsed. In an embodiment, there are two locator cameras 52 and two light sources 54 placed about the line of laser beam 46. By using two locator cameras in this way, the principle of triangulation can be used to find the three dimensional coordinates of any SMR within the field of view of the locator camera. In addition, the three dimensional coordinates of an SMR can be monitored as the SMR is moved from point to point. A use of two locator cameras for this purpose is described in U.S. Published Patent Application No. 2010/0128259 to Bridges, et al., the contents of which are herein incorporated by reference.

Figure 2:
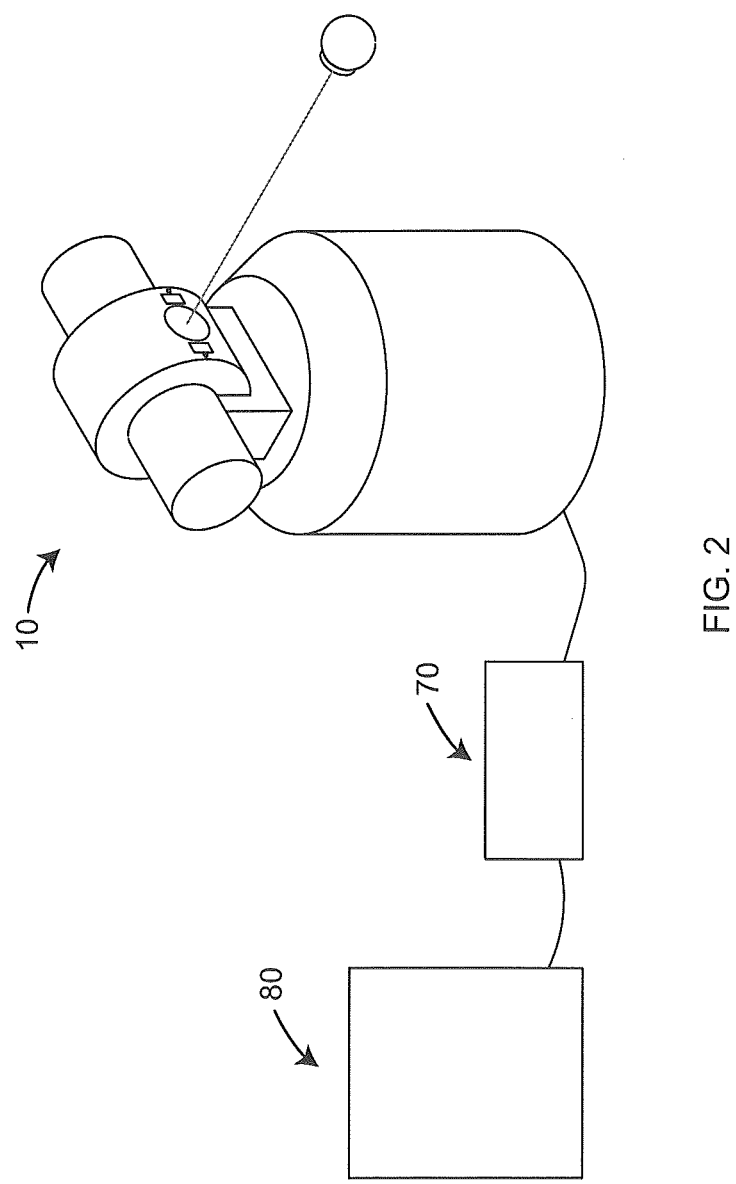
FIG. 2 is an illustration of a laser tracker, an auxiliary unit, and an external computer according to an embodiment.

As shown in FIG. 2, auxiliary unit 70 may be a part of laser tracker 10. The purpose of auxiliary unit 70 is to supply electrical power to the laser tracker body and in some cases to also supply computing and clocking capability to the system. It is possible to eliminate auxiliary unit 70 altogether by moving the functionality of auxiliary unit 70 into the tracker body. In most cases, auxiliary unit 70 is attached to general purpose computer 80. Application software loaded onto general purpose computer 80 may provide application capabilities such as reverse engineering. It is also possible to eliminate general purpose computer 80 by building its computing capability directly into laser tracker 10. In this case, a user interface, possibly providing keyboard and mouse functionality may be built into laser tracker 10. The connection between auxiliary unit 70 and computer 80 may be wireless or through a cable of electrical wires. Computer 80 may be connected to a network, and auxiliary unit 70 may also be connected to a network. Plural instruments, for example, multiple measurement instruments or actuators, may be connected together, either through computer 80 or auxiliary unit 70. In an embodiment, auxiliary unit is omitted and connections are made directly between laser tracker 10 and computer 80.

Figure 3:
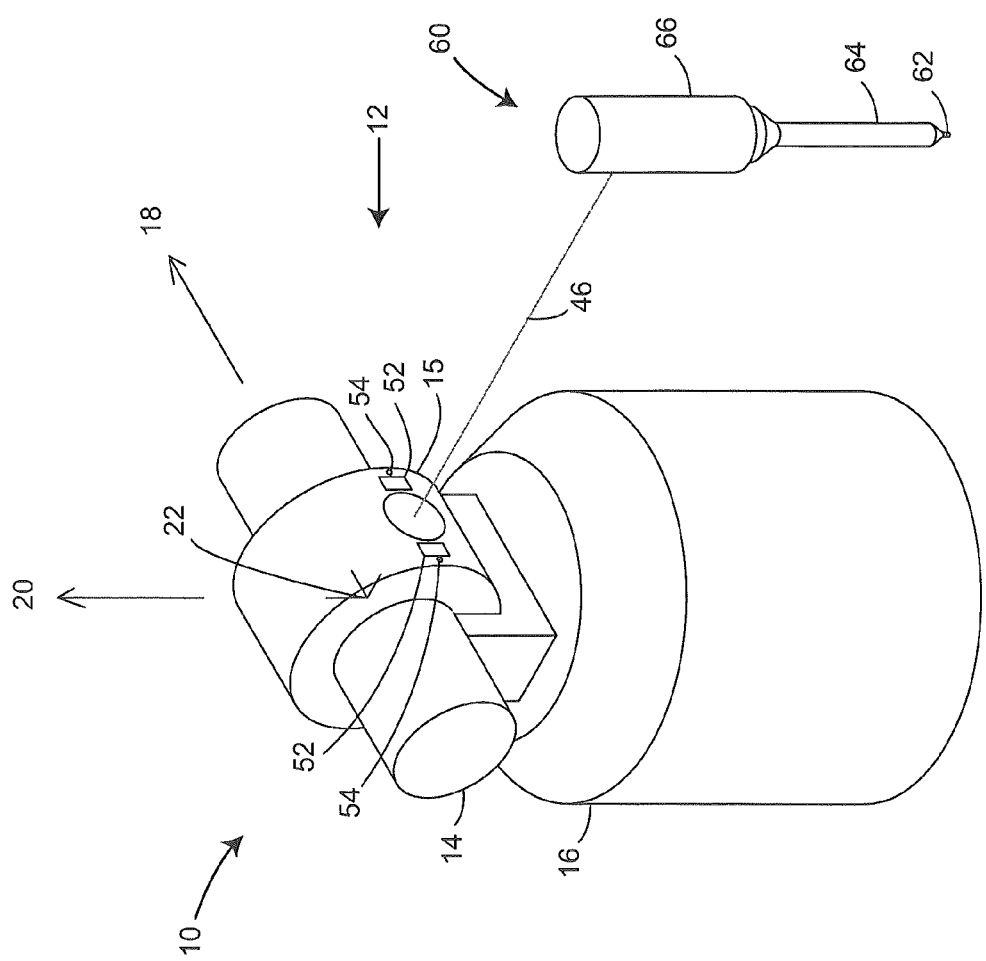
FIG. 3 is a perspective view of a laser tracker and a six-DOF probe according to an embodiment.

In FIG. 3, laser tracker 10 sends a laser beam to six-DOF probe 60. Six-DOF probe includes a retroreflector (not shown) that returns light 46 back to the tracker 10, a holder 66, a probe shaft 64, and a probe tip 62. The operator who holds six-DOF probe 60 places the probe tip 62 into contact with the workpiece at a point of interest. The laser tracker 10 in combination with the six-DOF probe 60 determines the three dimensional coordinates of probe tip 62. Such six- DOF probes are sometimes used to measure points that are not in the line of sight of the laser beam 46 from the laser tracker 10. For example, the probe tip may be placed behind an object while the retroreflector within six-DOF probe 66 is tracked by the tracker laser beam 46.

To determine the three-dimensional coordinates of the probe tip 62, the tracker measures six degrees of freedom of the probe tip. It measures the three translational degrees of freedom of the retroreflector reference point. For the cube corner retroreflector described hereinabove, the retroreflector reference point is the vertex of the cube corner. For a cateye retroreflector made of a single sphere (for example, using glass with refractive index equals two), the reference point is the center of the cateye sphere. For a cateye retroreflector made of two hemispherical elements, the reference point is centered on the two hemispherical elements on the plane that separates them. For a reflective photogrammetry target in the shape of a flat circle, the reference point is the center of the circle.

The three translational degrees of freedom may be described in a Cartesian frame of reference with x, y, and z coordinates. Alternatively, the three translational degrees of freedom may be described in a spherical frame of reference with radial distance r, azimuth angle phi, and zenith angle theta. The laser tracker 10 measures a distance r using either an interferometer or an absolute distance meter (ADM). It measures an azimuth angle phi and a zenith angle theta using angular encoders. Hence the laser tracker measures in a spherical coordinate system, although the coordinate values for any measured point may be converted into coordinates in any other desired coordinate system.

As stated herein above, some targets, such as six-DOF probe 60, require a tracker configured for six-DOF measurements. In addition to measuring the three translational degrees of freedom, the tracker must also be able to measure three orientational degrees of freedom. Together, three translational and three orientational degrees of freedom that produce six independent degrees of freedom fully specify (fully constrain) the position of every point within a rigid body—for example, the rigid body six-DOF probe 60.

The three degrees of orientational freedom may be described in a variety of ways. Methods for describing three degrees of orientational freedom include Euler angles and Tait-Bryan angles, the latter of which include the well-known pitch-yaw-roll and heading-elevation-bank descriptions. In the present application, the term three degrees of orientational freedom should be understood to mean three independent degrees of freedom. For example, a rotation about an x axis, a y axis, and a third axis in the x-y plane would represent only two degrees of freedom as the three axes are not independent. In other words, the three axes do not provide a method of specifying the rotation about the z axis and hence do not represent three independent degrees of freedom.

It is possible to have several interconnected objects that move independently. In such a situation, more than three degrees of freedom may be required to fully specify the motion of the collection of objects. Generally, a six-DOF probe such as probe 60 moves as a unit so that three degrees of orientational freedom are sufficient to fully describe the orientation of every point on the probe structure.

It should be similarly understood that three degrees of translational freedom means three independent degrees of translational freedom. Another way of saying this is that the three directions corresponding to the three degrees of translational freedom form a basis set in three-dimensional space. In other words, each of the three directions corresponding to a degree of translational freedom has a component orthogonal to each of the other two directions.

Figure 4:
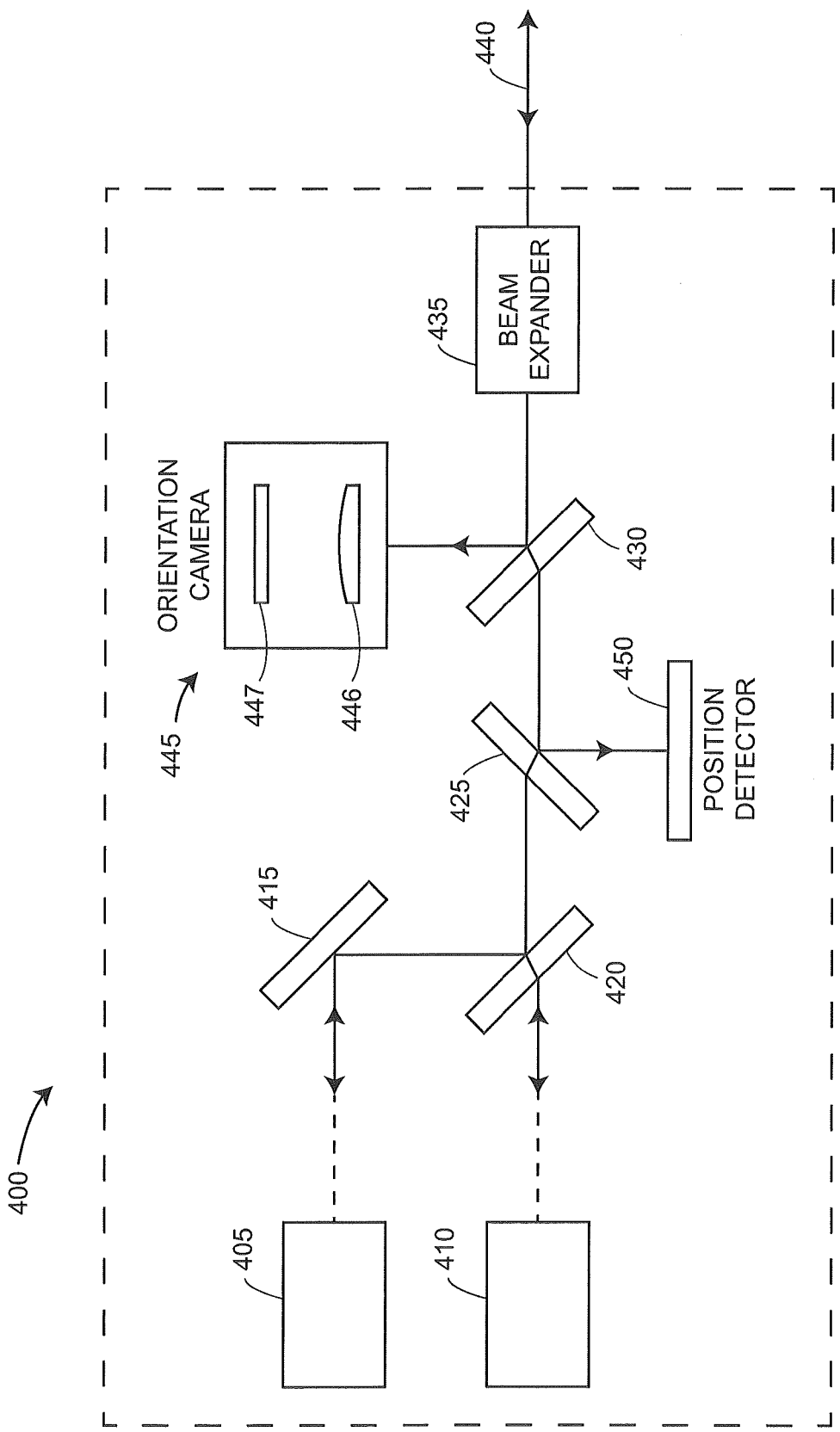
FIG. 4 is a block diagram showing elements in the payload of a laser tracker according to an embodiment.

FIG. 4 shows an embodiment for electro-optical assembly 400 of the laser tracker 10. Source elements 405 and 410 represent light sources and possibly additional electrical and optical components. For example, source element 410 may represent a red helium-neon laser in combination with an interferometer. Source element 405 may represent an infrared laser in combination with an absolute distance meter (ADM). Alternatively, the system may have only an interferometer or only an ADM. One of the source elements 405 or 410 may have only a source of light without a distance meter. There may be additional light sources (not shown) besides those contained within source elements 405 and 410. The source elements 405 and 410 may be located in payload 15 or they may be located in one of the other parts of the tracker such as the zenith carriage 14 or azimuth base 16. The light source may be located in one section, for example, the azimuth base, and the distance meter located in another section such as the payload 15. The light may be routed from one location to another by optical fibers, as explained in the '758 patent. Alternatively, the light from the source may be reflected off a mirror that is steered about the zenith axis, and the distance meters kept in the azimuth base 16. The light sources may include lasers, superluminescent diodes, light emitting diodes, or others.

Light from source element 410 passes through beam splitter 420. Light from source element 405 reflects off mirror 415 and beam splitter 420. If source elements 405, 410 contain light of different wavelengths, beam splitter 420 may advantageously be a dichroic beam splitter than transmits the wavelength of light emitted by source element 410 and reflects the wavelength of light emitted by source element 405.

Most of the light from beam splitter 420 passes through beam splitters 425 and 430. A small amount of light is reflected off each of these mirrors and is lost. The light passes through beam expander 435. The beam expander 435 expands the size of the beam on the way out of the tracker. The laser light 440 leaving the tracker 10 travels to a retroreflector target 26 or a retroreflector probe 60. A portion of this laser light returns to the tracker. The beam expander reduces the size of the beam on the way back into the tracker. In an embodiment, some of the light reflects off beam splitter 430 and travels to orientation camera 445. The orientation camera is used to obtain the three degrees of orientational freedom of the six-DOF probe 60 or any other six-DOF device. Orientation camera contains a lens system 446 and a photosensitive array 447. It may use a motor to adjust the size of the image. The principal of operation of the orientation camera is explained in the '758 patent.

Part of the light travels to beam splitter 425. Most of the light passes on to elements 405, 410 but a small amount is split off and strikes position detector 450. In some cases, the light may pass through a lens after reflecting off beam splitter 425 but before striking position detector 450. The position detector 450 may be of several types—for example, a position sensitive detector or photosensitive detector. A position sensitive detector might be a lateral effect detector or a quadrant detector, for example. A photosensitive array might be a CMOS or CCD array, for example. Position detectors are responsive to the position of the returning light beam. The motors attached to the azimuth mechanical axes and the zenith mechanical axes are adjusted by a control system with the tracker 10 to keep the returning light beam centered, as nearly as possible, on the position detector 450.

As explained in the '758 patent, the orientation camera 445 provides the tracker 10 with one method of measuring the six degrees of freedom of a target. Other methods are possible, and the methods described herein for measuring the center of a spherical target are also applicable to these other methods.

The traditional SMR 26 includes a body having a spherical exterior portion and a retroreflector. The body contains a cavity sized to hold a cube corner retroreflector, which is attached to the cavity. The spherical exterior portion has a spherical center.

A cube corner retroreflector includes three planar reflectors that are mutually perpendicular. The three planar reflectors intersect at a common vertex, which in the ideal case is a point. Each of the planar reflectors has two intersection junctions, each intersection junction of which is shared with an adjacent planar reflector for a total of three intersection junctions within the cube corner retroreflector. The cube corner retroreflector has an interior portion that is a region of space surrounded on three sides by the planar reflectors.

Cube corner retroreflectors may be open-air cube corners or glass cube corners. Open-air cube corner retroreflectors have an interior portion of air, while the glass cube corner retroreflectors have an interior portion of glass. The glass cube corner retroreflector is a type of glass prism. One surface of the glass prism called the top surface is distal to the vertex.

The SMR is designed for use with a laser tracker for measuring three degrees of freedom. A more powerful version of the SMR is the spherical six-DOF target. Some examples of six-DOF targets are shown in FIGS. 8A-D and 9A-D. These will be discussed in more detail hereinafter.

One type of six-DOF target uses cube corners containing marks or non-reflecting portions, as explained in the '758 patent. Each intersection junction of the cube corner retroreflector may have a non-reflecting portion. The non-reflecting portion does not necessarily suppress all light that it reflects or scatters. Rather the non-reflecting portions are configured to greatly reduce the return of light to the tracker. The reduced return of light may be achieved, for example, by making the non-reflecting portion from (a) an absorbing material such as an absorbing coloration or an absorbing tape, (b) a scattering surface texture or material, (c) a curved reflective surface that results in a diverging pattern of light, or (d) a planar surface that reflects the light away from the laser tracker. Other methods for making the non-reflecting portion achieve a reduced return of light may be utilized in light of the teachings herein, as should be apparent to one of ordinary skill in the art.

Figure 5:
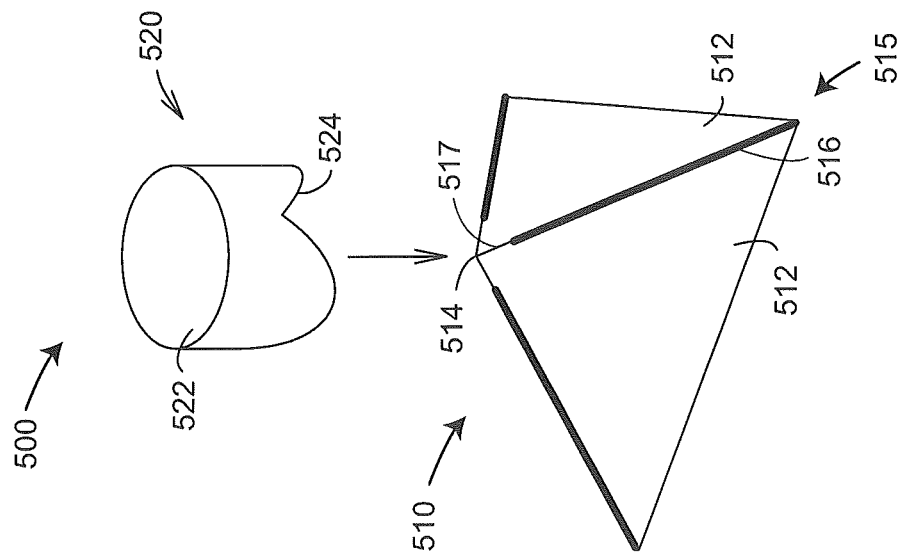
FIG. 5 is a perspective view of a cube corner slug and a master element used in retroreflector replication according to an embodiment.

There are at least two common methods for making open-air cube corner retroreflectors: replication and assembly of glass panels. FIG. 5 illustrates the replication process. A master element 510 is carefully machined to produce the characteristics desired in the final replicated retroreflector. For example, the master element 510 may be machined to make each of the three planar reflector faces 512 almost exactly perpendicular to its two neighbors 512. For example, the planar reflector faces 512 of the master element 510 may be perpendicular to each of its nearest neighbors to within one or two arc seconds. The master element 510 is coated with a reflective material such as gold. A cube corner slug 520 includes a machined blank 522 coated with a thin adhesive layer of material such as epoxy. The cube corner slug 520 is brought in contact with the master element 510. In doing so, the epoxy layer is brought into conformance with the shape of the master element 510. After the epoxy cures and the slug 520 is lifted off the master element 510, the gold layer sticks to the epoxy, thereby providing the cube corner slug 520 with a reflective coating.

Usually, the intersection junctions of the master element 510 are not perfectly sharp. One reason for this lack of sharpness is the difficulty of machining such sharp intersection junctions. Another reason is that the intersection junctions tend to chip during repeated replications if the junctions are too sharp. Instead, the intersection junctions are usually rounded with a small fillet or angled with a small bevel. Usually, for cube corners that are placed in spherically mounted retroreflectors used to measure three degrees of freedom, these features are made as small as practical. For example, a fillet applied to the intersection junctions of master element 510 might have a radius of curvature of 0.003 inch. This radius of curvature is transferred to the intersection junctions of slug 520. The fillet or bevel applied to the cube corner retroreflector is a non-reflecting portion according to the explanation given hereinabove. In other words, very little light will return to the laser tracker after striking a fillet or bevel applied to the intersection junctions of the cube corner retroreflector.

If the cube corner retroreflector is to be used in conjunction with a system to measure six degrees of freedom similar to that described in the '758 patent, then it may be desirable to broaden the non-reflecting portions observed by the orientation camera within the laser tracker. If a six-DOF target is only a few meters away from the tracker, then the narrow non-reflecting portions commonly present in high quality SMRs may be wide enough to be easily seen by the orientation camera. However, if the six-DOF target is located farther away—for example, up to 30 meters from the laser tracker—then the non-reflecting portions will need to be widened to make them visible on the orientation camera. For example, the non-reflecting portions might need to be about 0.5 mm wide to be clearly seen by the orientation camera.

Figure 7:
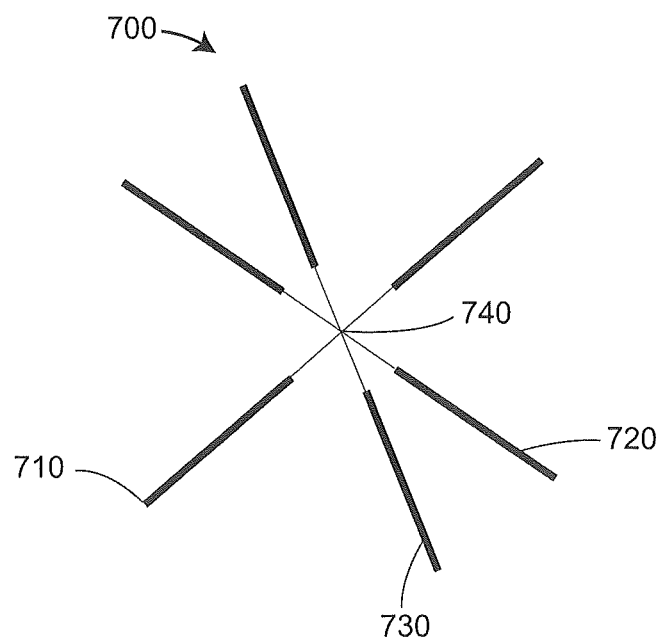
FIG. 7 is an example of an illumination pattern produced by non-reflecting portions of a retroreflector and impinging on an orientation camera within the laser tracker according to an embodiment.

In FIG. 5, the non-reflecting portion 517 near the vertex 514 is narrower than the non-reflecting portion 516 farther from the vertex. By reproducing this combination of non-reflecting portions 515 on each of the three intersection junctions, a pattern like that of FIG. 7 is observed on the orientation camera 445 within the laser tracker 10. The thickness of the non-reflecting portions on the intersecting junctions on the slug 520 may be controlled by adjusting the radii of curvature on the intersecting junctions of the master element 510.

The second common method of making open-air cube corner retroreflectors is to join mirror panels into a cube-corner assembly. Three mirror panels are joined together to be mutually perpendicular. There are slight gaps at the intersection regions between glass panels. Light that strikes the gaps is not reflected back to the laser tracker and so represents non-reflecting portions. If thicker lines are desired, these may be obtained, for example, by (a) increasing the width of the gap, (b) coloring (darkening) the mirrors over the desired portions, or (c) attaching low reflection material (e.g., black adhesive tape) at the intersection junctions.

Figure 6:
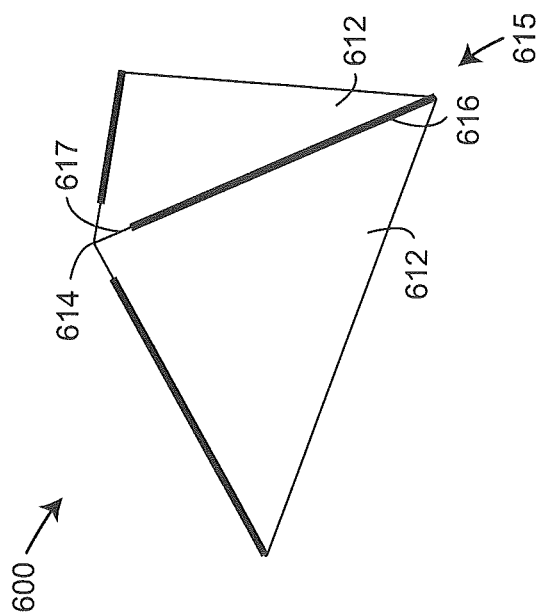
FIG. 6 is a perspective view of a glass cube corner with non-reflecting portions at intersecting junctions according to an embodiment.

Referring now to FIG. 6, a glass cube corner retroreflector 400 has planar reflectors 612 that are mutually perpendicular. The non-reflecting portions of glass cube corner retroreflector 600 shown in FIG. 6 are obtained by removing some of the glass along the intersection junctions. The non-reflecting portion 617 near the vertex 614 is thinner than the non-reflecting portion 616 farther from the vertex 614. A relatively thin non-reflecting portion 617 may be obtained by using a relatively small bevel, and the relatively thick non-reflecting portion 616 corresponds to the relatively large bevel. If desired, the bevels could be replaced by other shapes such as fillets. In general, the non-reflecting portions in the glass cube corner prism 600 are obtained by removing glass at the intersection junctions. This removed material may take such forms as bevels or fillets. In most cases, most of the light scattered off the bevels or fillets will not return to the laser tracker. If desired, loss can be further increased by darkening or otherwise treating the bevels or fillets, or absorptive adhesive material may be applied to the bevels or fillets.

FIG. 12 of the '758 patent illustrates an image pattern 100 in the prior art appearing on an orientation camera within a laser tracker. The three lines shown in this figure were obtained by illuminating a cube corner retroreflector onto which non-reflecting portions were placed on each of the three intersection junctions of the three planar surfaces of the cube corner retroreflector. The vertex of the cube corner retroreflector corresponds to the intersection point of the lines. Each of the lines in this figure extends on both sides of the intersection (vertex) point because each non-reflecting portion blocks laser light on the way into and on the way out of the cube corner.

A potential problem with non-reflecting portions placed on a cube corner retroreflector to produce the pattern of FIG. 12 of the '758 patent is that a large amount of light may be lost near the center of the retroreflector where the optical power is the highest. In some cases, the result of the reduced optical power returning to the laser tracker is a decrease in tracking performance and a decrease in the accuracy of distance and angle measurements by the laser tracker. To get around this problem, the non-reflecting portions may be modified to produce an illumination pattern 700 like that shown in FIG. 7. Such modifications are possible using the methods already described in conjunction with FIGS. 5 and 6. In FIG. 7, the lines 710, 720, 730 adjacent to the vertex point 740 are relatively narrow compared to the lines farther from the vertex.

A cube corner retroreflector having non-reflecting portions may be embedded in a sphere, as shown in FIGS. 8A-D and 9A-D, or in a probe, as shown in FIG. 1 of the '758 patent. FIG. 8A shows a spherical six-DOF target 800 including a spherical body 802, an open-air cube corner retroreflector 804 with non-reflecting portions, a collar 806, and a reference mark, or feature, 801. A cavity in the spherical body 802 is sized to accept the cube corner retroreflector 804. The cube corner retroreflector 804 is at least partially disposed in spherical body 802, possibly with adhesive. The collar 806 provides protection for the cube corner retroreflector 804 and provides a convenient grip. The reference mark, or feature, 801 is used to establish a coarse reference orientation for the target 800. The reference feature 801 may also be a textural feature such as a dimple or bump. The reference feature may be any feature that enables the user to distinguish a particular position or orientation of the retroreflector 804. FIG. 8B shows a cross sectional view taken through the center of the spherical six-DOF target 800. The cross section reveals the open-air cube corner 804 to be of the replicated type, but a cube corner retroreflector formed of three mirror panels could equally well be used. The retroreflector 804 is at least partially disposed within the cavity 815. FIG. 8C shows a front view of the spherical six-DOF target 800. The three intersection junctions 809 are visible about vertex 808.

The coarse orientation of the retroreflector is determined when there is an ambiguity in the orientation of the retroreflector because of the symmetry of the retroreflector. For example, in a cube corner retroreflector, the three intersecting lines 710, 720, 730 formed by the three reflecting surfaces, as shown in FIG. 7, extend on both sides of the center point 740. For the case in which the axis of symmetry is aligned with the direction of the laser beam 46 from the laser tracker 10, the lines 710, 720, and 730 are separated by 60 degrees. In this case, there is a six-fold degeneracy, which is to say that the six lines cannot be assigned to the particular physical lines on the cube corner. To eliminate the degeneracy, a method is used to establish a coarse orientation by which a particular line of a cube corner retroreflector is associated with a particular line that appears in an image on an orientation camera within a laser tracker. Although the example given here is for a method of measuring six degrees of freedom using a target that includes a cube corner retroreflector, the measurement made with an orientation camera included in a laser tracker, the principle may be applied more generally to other types of retroreflectors, other types of targets, and other methods of determining the six degrees of freedom of a target.

FIG. 9A shows a spherical six-DOF target 900 including a spherical body 902, a glass cube corner retroreflector prism 904 with non-reflecting portions, a collar 906, and a reference mark, or feature, 901. A cavity in the spherical body 902 is sized to accept the cube corner retroreflector 904. The cube corner retroreflector 904 is at least partially disposed in the cavity. The collar 906 provides protection for the cube corner retroreflector 904 and provides a convenient grip. The reference mark, or feature, 901 is used to establish a coarse reference orientation for the spherical six-DOF target 900. FIG. 9B shows a cross sectional view taken through the center of the spherical six-DOF target 900. The retroreflector 904 is at least partially disposed within the cavity 915. FIG. 9C shows a front view of the spherical six-DOF target 900. The three intersection junctions 909 are beneath the top surface of the glass prism and so are shown as dashed lines about the vertex 908.

FIG. 8D shows an interface component 820 attached to spherical six-DOF target 800 to produce an enhanced spherical six-DOF target 810. Interface component 820 may contain a number of optional elements. One such optional element is a reference feature 822, which may be a reference mark, a retroreflector (e.g., a small glass cube corner retroreflector), a region of reflective material, or a target light (e.g., an LED). The retroreflector or region of reflective material may be illuminated by a light from the laser tracker and the image captured by a locator camera in the laser tracker to determine the coarse orientation of the target 810. Alternatively, the target light may be illuminated and the image captured by a locator camera on the laser tracker to determine the coarse orientation of the target 810. The reference feature 822 may be left off altogether in which case the interface component 820 may itself serve as a reference mark, or feature. In this case, the operator aligns the target 810 in a prescribed orientation which is understood to be the coarse orientation.

Another optional element of interface component 820 is identifier element 824. The identifier element 824 may take the form of a bar-code pattern or radio-frequency identification (RFID) tag, for example. In an embodiment, the bar code has a one-dimensional pattern that includes a series of parallel lines of differing thicknesses and spacings. In another embodiment, the bar code has a two-dimensional pattern that includes a series of dots or squares spaced in a two-dimensional pattern. The tracker may read the contents of the bar code using a locator camera placed, for example, on the front of the tracker or with an orientation camera. The tracker may read the identity of the RFID tag by illuminating the RFID tag with radio frequency (RF) energy. The identifier element 824 may contain a serial number that identifies the particular target 810. Alternatively, the identifier element may contain one or more parameters that characterize the target 810. A serial number could include letters or other symbols as well as numbers and is intended to identify a particular target. Parameters could provide any information about any aspect of the device—for example, geometrical characteristics or thermal characteristics. A serial number may be used by a processor to gain access to parameters associated with a particular target.

Another optional element of interface component 820 is antenna 830. Antenna 830 may be used to send and/or to receive wireless data in the form of radio frequency signals. Such an antenna may be attached to a small circuit board that is powered by a small battery 828 that fits inside interface component 820. The small circuit board may be made of rigid-flex material which permits a very compact circuit to be enclosed within the interface component.

The identification function performed by identifier element 824 may instead be carried by saving the identification information, which might be a serial number or one or more parameters, in the electrical components of the circuit board within the interface component 820 and then transmitting the identification information to the laser tracker with an RF signal from the antenna 830 or with an optical signal from the target light at 822. RF and optical signals are two examples of electromagnetic signals that might be used to transmit identification information. As used here, optical signals may include ultraviolet, visible, infrared, and far infrared wavelengths.

The interface component 820 may also be provided with one or more optional actuator buttons 826. The actuator buttons 826 may be used to start and stop measurements or to initiate a variety of other actions. These buttons may be used in combination with indicator lights on the laser tracker to ensure that the tracker has received the intended commands.

The interface component 820 may also contain a temperature sensor 832 mounted within the target—for example, on the spherical body 802 or cube corner retroreflector 804. As the spherical body 802 and cube corner retroreflector 804 are heated or cooled, the position of the vertex 808 may shift since in general the spherical body 802 and cube corner retroreflector 804 may be made of different materials having different coefficients of thermal expansion (CTEs). By tracking the temperature of the target 810, compensation may be performed to shift the position of the vertex 808 by an appropriate amount.

The interface component may include an air temperature sensor assembly 834 comprising a temperature sensor 836, protector 838, and insulation (not shown). The temperature sensor may be a thermistor, RTD, thermocouple, or any other device capable of measuring temperature. It may be placed in a protector structure, which might be a hollow cylinder, for example. The purpose of the protector is to keep the temperature sensor from being damaged and to keep heat sources away from the temperature sensor. The protector is open at the end and may contain perforations to increase exposure of the temperature sensor to air. Insulation is provided between the body 802 and the air temperature sensor 836. The insulation keeps the sensor from being exposed to the metal of the target, which may be at a different temperature than the surrounding air.

A possible use of air temperature assembly 834 is to measure the temperature of the air as a function of position within the measurement volume. This may be important because measured distance and measured angles depend on the temperature of the air. For example, to get the distance from the tracker to a target, one of the tracker processors calculates the distance by dividing the uncorrected measured distance (as measured by the tracker interferometer or ADM) by the average index of refraction of the air over the path from the tracker to the target. The index of refraction, which is found using the Edlin equation or the Ciddor equation, finds the index of refraction of the air based on the temperature, pressure, and humidity of the air measured by sensors attached to the tracker. The resulting corrected distance value is the distance the tracker interferometer or ADM would have measured if the air were replaced by vacuum. Unlike pressure and humidity, which tend to be relatively constant over a measurement volume, the temperature often varies significantly over the measurement volume. Ordinarily, the temperature of the air in a measurement volume is estimated by placing a temperature sensor at a particular location and assuming that the air temperature has the same value at all positions within the measurement volume. A more accurate way to correct for temperature over the measurement volume would be to move the target 810 from a starting position at the tracker to an ending position near the measurement region, keeping track of the temperature at all distances and calculating the average temperature over those distances. The time constant of the air temperature sensor 836 should be set fast enough to enable the sensor to respond to changes in temperature as the operator carries the target 810 to different positions within the measurement volume. An alternative is to take the average of a first air temperature read by an air temperature sensor near the tracker and a second air temperature read by the air temperature sensor 832 on the target.

FIG. 9D shows an interface component 920 attached to spherical six-DOF target 900 to produce an enhanced spherical six-DOF target 910. Interface component 920 may contain a number of optional elements, which are analogous to the optional elements in the interface component 820. The optional elements 922, 924, 930, 928, 926, and 932 have the same description as the optional elements 822, 824, 830, 828, 826, and 932. Because of this, the descriptions will not be repeated here.

FIG. 10A is a perspective view of a spherical six-DOF target 1000, which includes glass cube corner 1004, spherical body 1002, and collar 1006. One or more non-reflecting marks 1008 are placed on the top surface, which is the surface distal to the vertex, of the glass cube corner 1004. A possible reason for using such marks is to provide a way of determining the three degrees of orientational freedom even when the target is tilted to an extreme angle. In FIG. 10A, three such marks 1008 are provided to enable the spherical six-DOF target 1000 to be tilted to an extreme angle in any direction. The optional marks 1010 provide a way to more accurately determine the roll angle of the target 1000. FIG. 10B is a front view of spherical six-DOF target 1000.

FIGS. 11A-C depict three embodiments of spherical six-DOF targets. In FIG. 11A, the spherical six-DOF target 1100 includes a spherical body 1102, a cube corner retroreflector 1104, and a collar 1106. A region of reflecting material 1110 is placed on the front surface of collar 1106. This region of reflecting material 1110 is illuminated by light from the laser tracker and its position is determined by a locator camera within the tracker. The position of the region 1110 is used to find the coarse orientation of the spherical six-DOF target 1100. In FIG. 11B, the spherical six-DOF target 1120 includes the same elements as spherical six-DOF target 1100 except that the region of reflecting material 1110 is replaced by a bar code pattern 1130. The bar code pattern 1130 may serve to provide an identification of the target 1120 and it may also act as a region of reflecting material to provide a coarse orientation of the target 1120. If desired, the bar code pattern may extend around the entire circumference of the collar lip rather than only a portion of the lip as shown in FIG. 11B. If desired, the type of bar code pattern known as a radial pattern may be used. In FIG. 11C, the spherical six-DOF target 1140 includes the same elements as spherical six-DOF target 1100 except that the region of reflecting material 1110 is replaced by an RF identification chip 1150. This chip may be interrogated by an RF transmitter/receiver to obtain information about the spherical six-DOF target 1140. This information may be a serial number or one or more parameters of the target 1140.

Figure 12A:
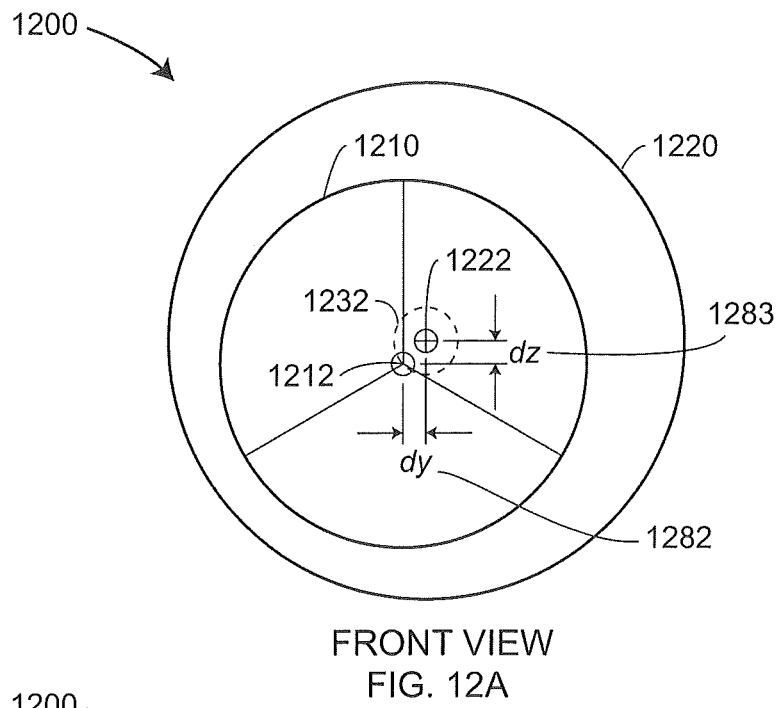
FIGS. 12A-B are front and side sectional views, respectively, of an SMR having a cube corner retroreflector not perfectly centered within a sphere.

FIG. 12A shows a front view of a target 1200, which may be an SMR or a spherical six-DOF target. The body 1220 has a spherical exterior portion represented by the outer circle. The retroreflector 1210 is represented by the inner circle and the three intersection junctions are represented by three intersecting lines. The three lines intersect at the vertex 1212. The spherical exterior portion has a sphere center 1222, indicated in FIG. 12A by a + sign surrounded by a circle. If the target 1200 is placed in a nest and rotated, the center 1222 will remain fixed, but the vertex will be rotated in a circular pattern about the center. The resulting circular pattern is called a runout pattern 1232 that may be said to have a runout radius or runout diameter. The three planar reflectors that intersect in the intersection junctions of the retroreflector have an axis of symmetry. If FIG. 12A is oriented so that the axis of symmetry is perpendicular to the viewing direction, then the plane of the paper may be called the transverse plane and directions within the transverse plane may be called transverse directions. The front view of FIG. 12A shows the errors in the positioning of the retroreflector vertex 1212 in the transverse plane. These errors are shown as dy and dz in FIG. 12A and are referred to as the transverse errors 1282 and 1283, respectively. A two dimensional transverse error vector may be drawn from the sphere center 1222 in a y-z plane. The error vector will map out a circle having a radius equal to the runout radius.

Figure 12B:
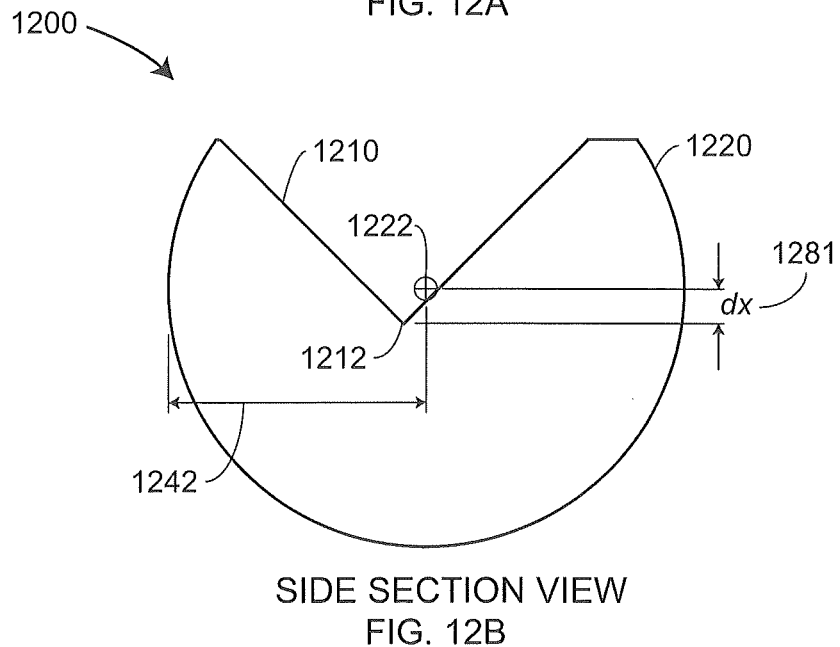

FIG. 12B shows a side sectional view taken through the vertex 1212. In this view, the axis of symmetry lies in the plane of the paper. The error in direction of the axis of symmetry is called the depth 1281 and is shown as dx.

A three dimensional error vector may be drawn from the sphere center 1222 to the vertex 1212. The three errors dx, dy, and dz are called the vector length components. It is also possible to decompose the error vector into other directions. For example, it would be possible to select dx to be off the axis of symmetry, and the components dy and dz may be taken perpendicular to dx.

The error vector has three length components dx, dy, dz in FIGS. 12A-B. It is possible to measure these three length components of a target 1200 before the targets are used with tracker 10. By measuring the three orientational degrees of freedom with a six-DOF tracker, it is the possible to correct the measured position of the vertex to obtain a corrected position for the center of the sphere. In this way, the accuracy of tracker readings can be improved. Similarly, this capability brought about by six-DOF measurements makes it possible to use inexpensive spherical six-DOF targets whose center, though off the retroreflector reference point (e.g., vertex) by a considerable distance, can be found with relatively high accuracy nonetheless.

The target 1200 is given a target frame of reference. For example, such a frame of reference is given in FIGS. 12A-B. The x, y, and z directions are shown in these figures. The user may select the sphere center 1222 or the vertex 1212 to be the origin of the target frame of reference, as desired. The device, which might be a laser tracker, also has a device frame of reference. To transform the vertex position 1212 into the sphere center 1222, the rotational transformation is performed to make the axes of the target frame of reference parallel to the corresponding axes of the device frame of reference. This may be done using rotation matrices, quaternions, or other methods that are well known to those of ordinary skill in the art. These well-known methods will not be discussed further. After the target and device frames of reference are aligned, the measured vertex position is shifted in the target frame of reference by the vector length components to get corrected three-dimensional sphere center coordinates.

Measurements are performed on targets 1200 to obtain the vector length components. For the alignment shown in FIGS. 12A-B, the two vector length components dy, dz are called the transverse lengths 1282, 1283, respectively, and the vector length component dx is called the depth 1281. There are many ways to find the two transverse lengths and the depth. One method is to have the target 1200 measured by an accurate Cartesian coordinate measuring machine (CMM). With such methods, the position of the vertex relative to the sphere center can be found to a fraction of a micrometer. Once a measurement has been accurately performed on a target 1200, the target may be treated as a master so that relative measurements can be performed optically. One method is to use a very accurate absolute distance meter to compare the depth of the target to the depth of the master target just calibrated with the Cartesian CMM. The difference in readings can be added to the error reported for the master target to find the depth in the target under test. The transverse lengths can be measured using a microscope without reference to a master target. A microscope can be used to see runout radii of about a micrometer, and the direction of the vertex in relation to the sphere center can also be determined.

FIG. 13A is a perspective view of a glass cube corner retroreflector 1330. It is a prism that has three planar reflectors 1332 that are mutually perpendicular and meet at a vertex 1334. The reflective surfaces of the prisms may be coated with a reflective film to enable reflection even when the cube corner is tilted at large angles of incidence (where total internal reflection no longer takes place.) The top surface 1338 is perpendicular to a line, or axis, of symmetry 1360 relative to the three perpendicular surfaces 1332. The edges 1340 of the prism are shaped into a cylinder, which produces a scalloped effect as the cylinder intersects with the planar reflectors 1332. To maximize the angle over which light can be received by the cube corner retroreflector 1330, the top surface 1338 is made nearly tangent to the uppermost point of the scalloped portions.

FIG. 13C is a spherical six-DOF target 1300. It includes a body 1310 that has a spherical external surface 1312, and it contains a cavity sized to hold the cube corner retroreflector 1330 and a collar 1320. Cube corner retroreflector 1330 is at least partially disposed within the cavity. FIG. 13B is a cross section of the target 1300 of FIG. 13C through the plane A-A in that figure. The dashed line 1342 in FIG. 13A shows where the section slice passes through the cube corner retroreflector 1330. The spherical external surface 1312 has a sphere center 1314, which in general is at a different point than the vertex 1334. In the embodiment shown in FIGS.

13A-C, 14, and 15, the spherical external surface 1312 has a diameter of 1.5 inches=38.1 mm. The top surface 1338 of the cube corner retroreflector 1330 has a diameter of 1 inch=25.4 mm, and a height 0.707 times this value, or 17.96 mm.

Figure 14:
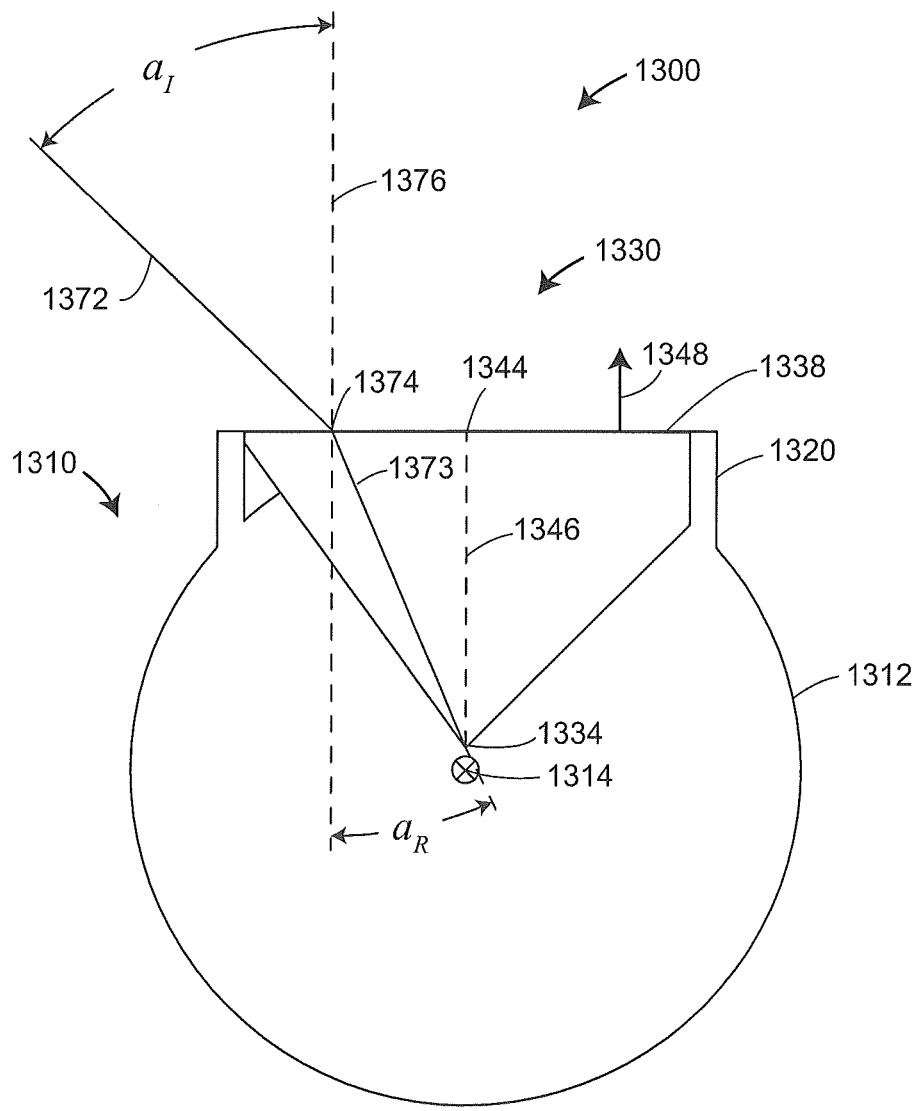
FIG. 14 shows a cross sectional view of a spherical six-DOF target and the path of a ray of light outside and inside the glass prism according to an embodiment.

FIG. 14 is an orthogonal view of cross section A-A of FIG. 13C. The hatch marks have been omitted to improve clarity. The sphere center 1314 is 1.3 mm below vertex 1334. The cube corner retroreflector 1330 has an altitude length 1346 corresponding to the line segment that extends from the vertex 1334 to the point 1344 at which the line, or axis, of symmetry 1360 intersects the top surface 1338. The top surface has a normal vector 1348, which in this case is parallel to the line, or axis, of symmetry 1360 but may not be parallel to the axis of symmetry in the general case. The top surface 1338 is placed slightly outside the sphere used to create the body 1310 (before material is removed to obtain the cavity that holds the retroreflector 1330). This has the advantage of providing a large contact region for the spherical exterior portion 1312.

The central ray 1372 from a beam of light emitted by the laser tracker 10 or other device intersects the cube corner at point 1374, bends and travels to the vertex 1334. The position detector 450 in FIG. 4, in combination with the motors and servo system of the laser tracker 10, keeps the beam approximately centered on the vertex 1334, even if the target 1300 is moved. At the point of intersection 1374, a line 1376 is constructed perpendicular to the top surface 1338. The central ray 1372 lies in the plane of the paper (the plane of cross section A-A). The angle of incidence $a_I$ is the angle from the normal 1376 to the central ray 1372. The angle between the normal 1376 and the refracted ray of light 1373 is the angle of refraction $a_R$. The angle of refraction can be found from Snell's law, which is $n_{air} \sin(a_I) = n_{glass} \sin(a_R)$. In this instance, the glass is selected to have an index of refraction of 1.85. For an angle of incidence of 46 degrees, the angle of refraction is approximately 23 degrees. The larger the angle of incidence the farther from the center 1344 of the top surface is the point of intersection 1374, which increases the chance of clipping the beam of light entering the retroreflector. In the instance shown in FIG. 14, the point of intersection is 5 mm from the edge of the top surface. Projected onto the direction of travel of the incident laser beam, the distance is about 3.5 mm, which means that a beam having a diameter of 7 mm can enter the retroreflector in the geometry shown in FIG. 14 without clipping.

FIG. 14 illustrates important advantages of the method taught herein for correcting the position of the center of a glass retroreflector. The acceptance angle, which is twice the largest allowable angle of incidence, is over 90 degrees in this case. This is a much larger acceptance angle than is possible with an open-air cube corner.

Because the light incident on the glass cube corner bends as it enters the glass, the position of the vertex will be improperly measured unless calculations take the bending of the light into account. It is possible to account for the bending of the light if the three orientational degrees of freedom of the glass cube corner are known. Since the target and the device both have a frame of reference, the three degrees of orientational freedom can be given for the target frame of reference as viewed within the device frame of reference.

In the '758 patent, equations were given in columns 14 and 15 for relating the pitch, yaw, and roll angles of an open-air cube corner to the slopes of the three lines observed on the photosensitive array of the orientation camera. The equations were compared to three dimensional rotations performed in CAD software to demonstrate their validity. In the '758 patent, the term slope is used in the usual way to indicate a change in ordinate (y) value divided by a corresponding change in the abscissa (x) value. It should be understood that other definitions for slope may be used (for example, the change in abscissa divided by the change in ordinate) if the relevant equations are modified correspondingly.

There are many computational methods that can be used to relate the orientational angles of the glass cube corner to the slopes of the lines that appear on the photosensitive array of the orientation camera. One method is described here. Three orientational angles are assumed. These may be described in terms of pitch, roll, yaw, or other orientational parameters. Each of the three lines corresponding to the intersection junctions are projected until they intersect a plane that includes the upper surface. These three points can be found using the altitude length and geometry of the cube corner. These three dimensional coordinates of these three points and of the vertex are transformed by a three dimensional rotation matrix, based on the three orientational degrees of freedom, to get new three dimensional coordinates for each. These transformed intersection points are called the junction points at the top surface. A normal vector to the upper surface may be constructed using a first point at the center of the upper surface and a second point of unit length that is perpendicular to the upper surface. These two points are transformed by the three dimensional rotation matrix to get a new normal vector. The light projected from the device in the device frame of reference makes an angle with respect to the new normal vector. The direction of the refracted light is found using vector mathematics. Since the light must intersect the vertex of the glass cube corner, the point of intersection of the central ray of light with the top surface can be found. This point of intersection with the top surface may be referred to as the apparent vertex. The lines that will be displayed on the orientation camera can now be obtained by connecting the apparent vertex with each of the three junction points at the top surface and then projecting these lines to be perpendicular to the direction of propagation of light back to the device. The lines may be drawn on both sides of the apparent vertex since the non-reflecting portions block light both on the way into and the way out of the retroreflector. The slopes of the lines from the calculations are compared to the slopes of the lines observed on the orientation camera. An optimization procedure is carried out to iteratively select parameters to minimize the least squared error until the best values for roll, pitch, and yaw are obtained. A coarse measurement, described in more detail below, is performed to get a good starting value for the calculations.

Figure 15:
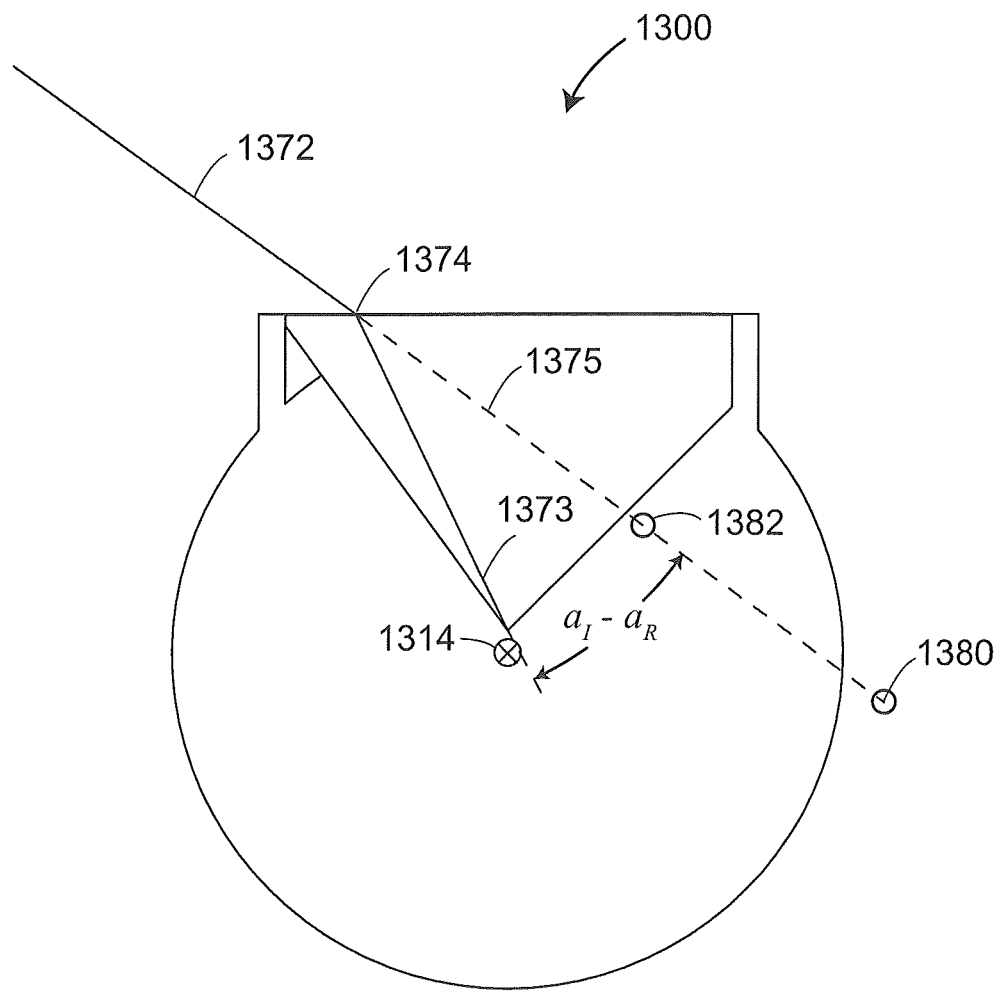
FIG. 15 shows a cross sectional view of a spherical six-DOF target and projected lines to illustrate the corrections made mathematically to correct for the bending of light.

After the three orientational degrees of freedom have been found, the results are used to correct the distance and two angles read by the laser tracker. In the absence of other knowledge, the device will believe that the vertex 1334 lies at position 1380 of FIG. 15. The direction of the vertex 1334 appears to lie along the direction of the central ray 1372 from the device. The device would measure the distance to the vertex as farther than the true distance because the light is traveling through glass, which has a higher index of refraction than air. The greater index of refraction causes the light to travel more slowly. Since distance meters such as interferometers and ADMs judge distance based on the time of flight of the light, a greater time spent in transit by the light results in the device judging the distance to be greater. Let the distance from the intersection point 1374 to the vertex 1334 be represented by the symbol T and let the index of refraction be represented by the symbol n. The distance measured by the tracker too large by T(n−1), which in this case is T(1.85−1)=0.85 T, since 1.85 was assumed to be the index of refraction. Usually, the index of refraction is the phase index of refraction for interferometers and the group index of refraction for absolute distance meters.

Once the three orientational degrees of freedom are known, the distance T can be found. If the normal vector 1348 is parallel to the axis of symmetry, then the distance T is found by dividing the altitude height by the cosine of the angle of refraction. If the normal vector 1348 is not parallel to the axis of symmetry, then the distance T is found using vector mathematics, the use of which is well known to one of ordinary skill in the art. To find the coordinates of the vertex 1334 in the device frame of reference, two steps are taken. First, the distance measured by the device is reduced by T(n−1), which moves the point 1380 to a new point 1382 on the line 1375. Next the intersection point 1374 is found by moving back along the line 1375 an additional distance T. The line 1375 is rotated about the calculated intersection point 1374 by an angle aI−aR, which causes the point 1382 to move to the vertex 1334.

To find the sphere center 1314, the target frame of reference of the target 1300 is rotated to make its axes parallel to those of the device frame of reference. The vertex position is then adjusted by the depth along the direction of the axis of symmetry to get the three dimensional coordinates of the sphere center.

As in the case of the open-air cube corner illustrated in FIGS. 12A-B, the vertex of the glass cube corner may be offset from the sphere center, not only in depth, but also in the two transverse directions perpendicular to the line, or axis, of symmetry 1360. This is done in the same manner as with the open-air cube corners by rotating the target frame of reference to make its axes parallel to the corresponding axes of the device frame of reference. The coordinates of the vertex are then shifted by appropriate depth and transverse length values to obtain the three dimensional coordinates of the sphere center in the target frame of reference.

Figure 16A:
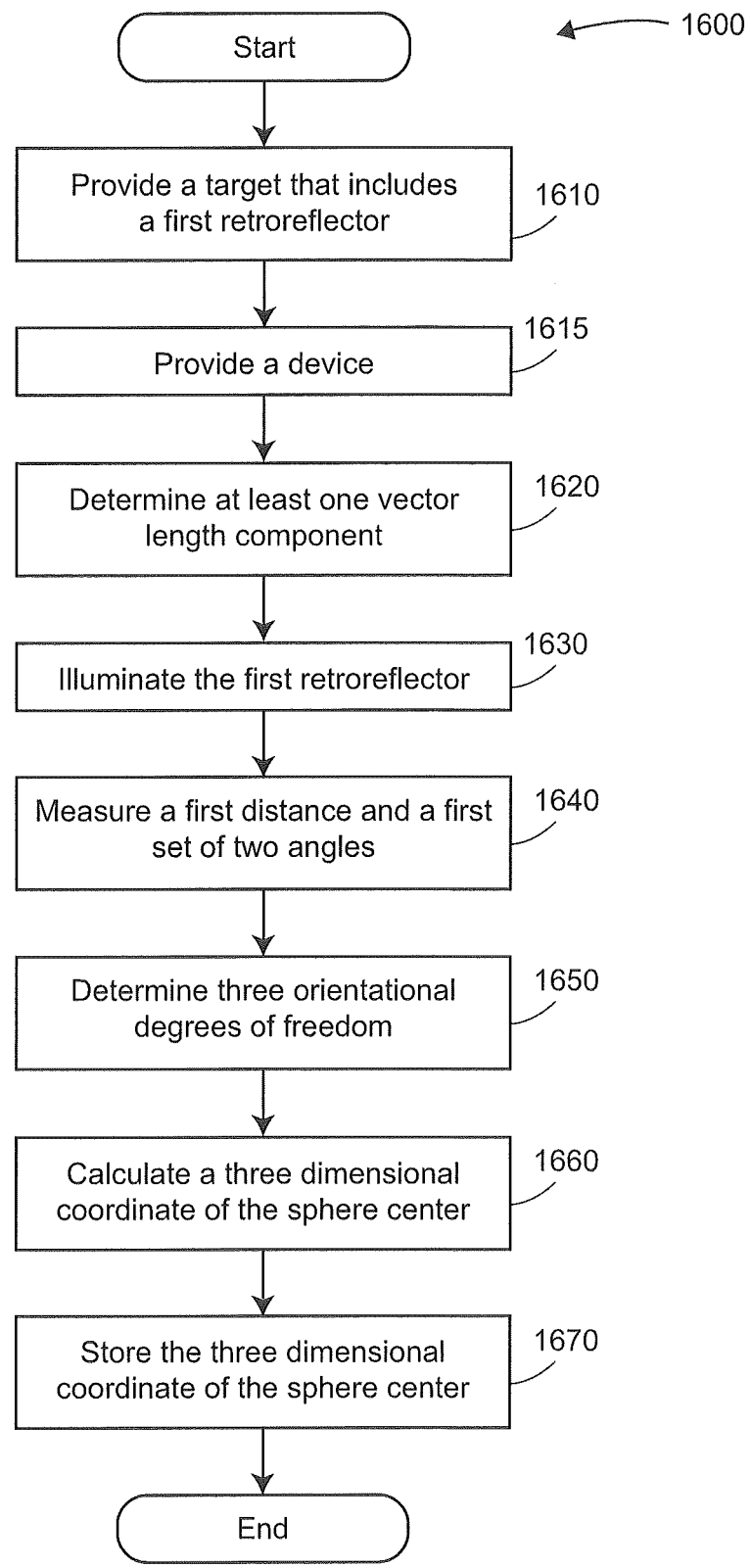
FIG. 16A shows the steps in a method for measuring the center of a sphere into which a retroreflector is embedded according to an embodiment.
Figure 16B:
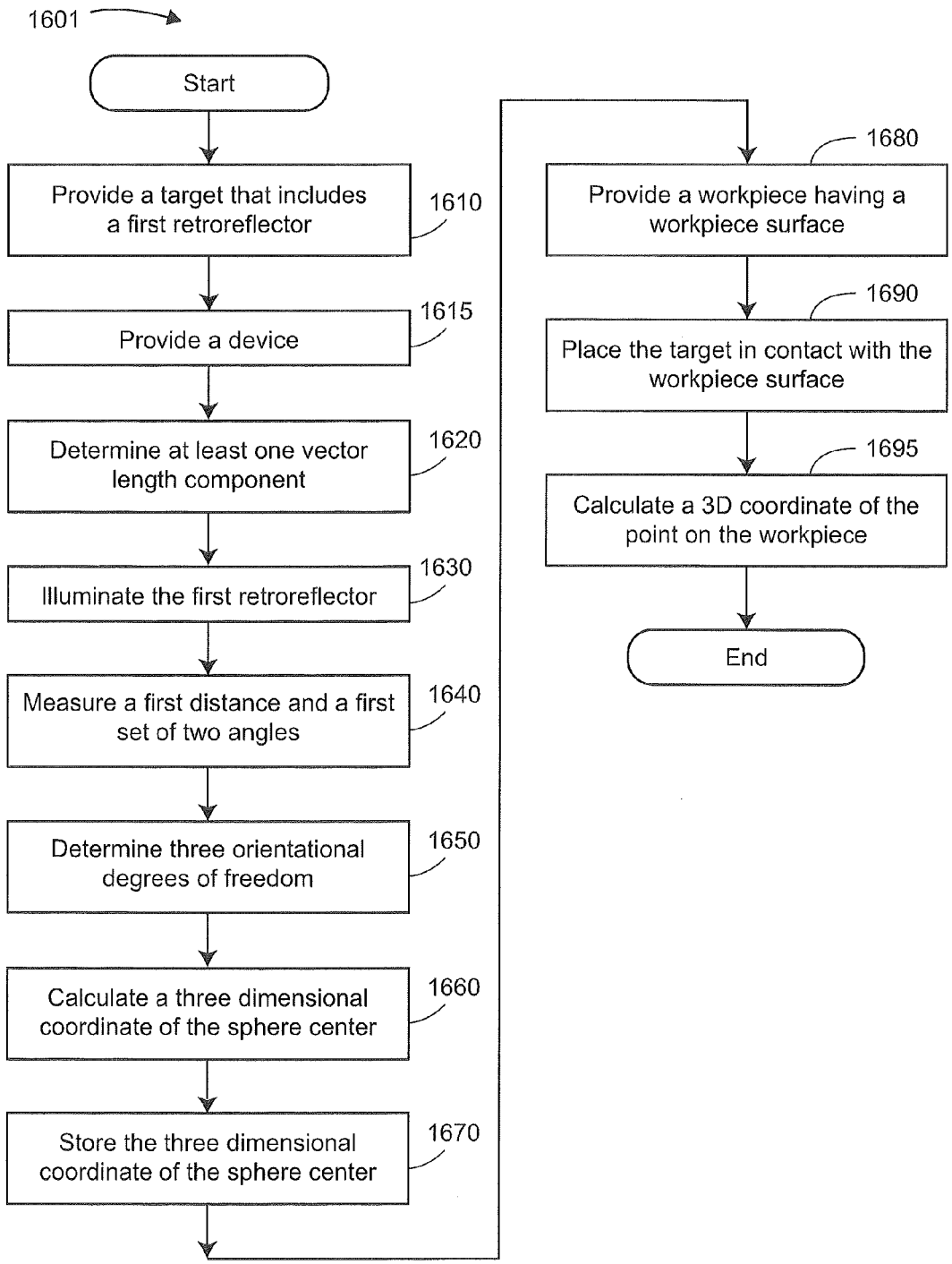
FIG. 16B shows the steps in a method for measuring a three-dimensional coordinate of a point on a workpiece surface according to an embodiment.

FIG. 16 describes a method 1600 for measuring the center of a spherical target. In step 1610, a first retroreflector is selected. The retroreflector may be a cube corner retroreflector, a cateye retroreflector, a photogrammetry target, or any other type of retroreflector. In step 1620, a length is provided for at least one component of the vector that extends from the sphere center to the reference point of the retroreflector. Each of the at least one length is called a vector length component. In a three dimensional space, there are three independent vector length components. For example, the vector length component may be the depth, which is a component along the axis of symmetry of the vector. It might also be a transverse length, which is by definition perpendicular to the axis of symmetry. In step 1630, a beam of light from the device illuminates the first retroreflector. For example, a laser beam from a laser tracker might illuminate a cube corner retroreflector within a spherical six-DOF target.

In step 1640, three orientational degrees of freedom are found. The method for doing this for open-air cube corner retroreflectors was explained in detail in the '758 patent. The method for doing this for a glass cube corner is explained in the present application. In step 1650, the device measures a first distance and a first set of two angles. For example, a laser tracker might measure an ADM or interferometer distance, a zenith angle, and an azimuth angle, each taken from a point on the tracker to a retroreflector reference point.

In step 1660, three dimensional coordinates are calculated for a sphere center of the target. One way to do this, as described above, is to rotate the target frame of reference to make the axes parallel to the corresponding axes of the device frame of reference. The retroreflector reference point of the retroreflector is then shifted by a specified amount in one or more directions. The values obtained for the three dimensional coordinates are the desired result. In step 1670, this result is saved—for example in a processor or processor memory.

Although the methods described hereinabove have mostly dealt with the case of cube corner retroreflectors, they are applicable to any type of retroreflector for which three orientational degrees of freedom can be obtained. A method of putting marks on or in the vicinity of the retroreflector target can be used with retroreflectors such as cateye retroreflectors and photogrammetric targets. A cateye retroreflector contains a top transmissive spherical surface and a bottom reflective spherical surface. The top and bottom spherical surfaces may have the same or different radii. One way to make a six-DOF target from a cateye is to place marks on the top spherical surface and an intermediate layer—for example a planar layer that separates an upper and a lower hemisphere of the cateye. Such marks would be decoded in a manner similar to that used with cube corner retroreflectors—by working out suitable mathematical formulas to relate the observed patterns to the three orientational degrees of freedom. In a similar manner, marks may be put on a photogrammetric dot held within a sphere. Such marks may be made on two or more levels to improve the sensitivity of the system for detecting tilt.

Some types of retroreflectors have symmetries that need to be resolved before a calculation can be completed to determine the three orientational degrees of freedom. For example, a cube corner retroreflector having intersection junctions marked with identical non-reflecting portions appears to have six-fold symmetry when viewed along the axis of symmetry. A three-fold symmetry in the intersection junctions can be seen in the front views of FIGS. 8C and 9C. Note that the lines are separated by 120 degrees. This three-fold symmetry turns into a six-fold symmetry in the light reflected by the cube corner because the light is blocked by the non-reflecting portions of the intersection junctions both for light entering and leaving the cube corner. As soon as the cube corner is tilted so that it is not viewed along the axis of symmetry, the six-fold symmetry is broken, but the requirement remains to associate at least one of the six marks in the image of the cube corner retroreflector with one of the physical intersection junctions. For example, in the pattern of FIG. 7, which represents the pattern of non-reflecting regions that might be seen in an orientation camera, at least one of the six non-reflecting marks must be identified as corresponding to one of the physical intersection junctions of the cube corner retroreflector.

The association between the physical marks and the pattern reflected by the retroreflector is found from the coarse orientation of the target. The association may be determined by a variety of methods, five of which are described here. A first method uses a reference mark, or feature, such as the mark 801 or 901 shown FIGS. 8A and 9A, respectively. At the start of a measurement, the operator holds the reference mark, or feature, in a prescribed orientation. For example, the reference mark, or feature, might be held horizontal with the retroreflector pointed straight toward the tracker. The device notes the position of the non-reflecting portions and relates these to the prescribed orientation to establish a coarse orientation in the device frame of reference. This coarse orientation enables software within the device to match a particular line seen on the photosensitive array to a particular intersection junction of the cube corner. With this method, the operator is notified if the coarse orientation is lost, so that the target can be again held in the prescribed orientation to re-establish a new coarse orientation. The operator may be made aware of the need to re-establish a coarse orientation by a flashing light on the device, emitting an audible sound, or using a variety of other methods.

A second method for establishing a coarse orientation uses a small reference retroreflector in the vicinity of the larger retroreflector. Such a reference retroreflector is shown as element 1708 in FIG. 17 of the '758 patent. A reference retroreflector may be located in a variety of positions near a larger retroreflector. In the present application, for example, a reference retroreflector may be located in position 822 of FIG. 8D or position 922 of FIG. 9D.

One mode for using a reference retroreflector to establish a coarse orientation is to simultaneously illuminate both the reference retroreflector and the larger retroreflector. This may be done, for example, by flashing the light sources 54 near orientation cameras 52. If the laser tracker 10 is relatively close to the target, the locator camera will be able to distinguish the relative positions of the two light sources, thereby establishing the coarse orientation.

A second mode for using a reference retroreflector to establish a coarse orientation is to begin by moving the laser beam from the tracker to a first steering angle (comprising a first azimuth angle and a first zenith angle) to center the laser beam on the larger retroreflector. The tracker then moves the beam away from the center of the retroreflector by the distance from the larger target to the smaller target. The laser tracker does this by moving the laser beam by an angle in radians equal to a distance, known in advance from the target dimensions, divided by the distance from the tracker to the retroreflector target. After the laser beam has been moved away from the center, it is rotated in a circular pattern about the initial center point until the smaller retroreflector is intercepted. The laser beam is then centered on the smaller target to obtain a second steering angle (comprising a second azimuth angle and a second zenith angle). The coarse orientation is determined from the relative values of the first and second steering angles. This second mode for using a reference retroreflector is useful when the distance to the target is too large to be accurately measured with the locator cameras 52.

A third method for establishing a coarse orientation is to use a target light, which might be an LED, located in position 822 or 922. Such a target light is illuminated to enable a locator camera, such as the locator camera 52, to view the position of the target light relative to the retroreflector. In this way, the location of a feature of the retroreflector, such as an intersection junction, for example, may be tagged by the target light.

Figure 17A:
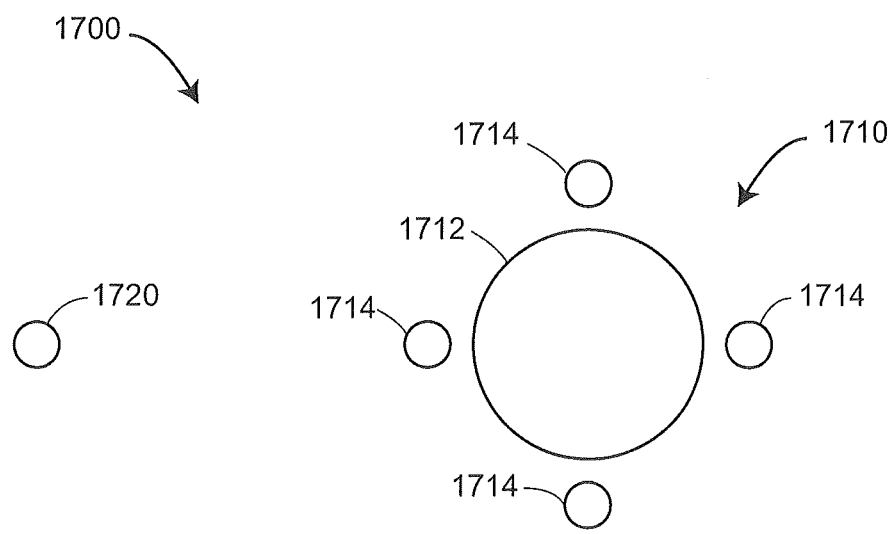
FIG. 17A shows a locator camera located on a tracker and surrounded by near lights and a far light according to an embodiment.
Figure 17B:
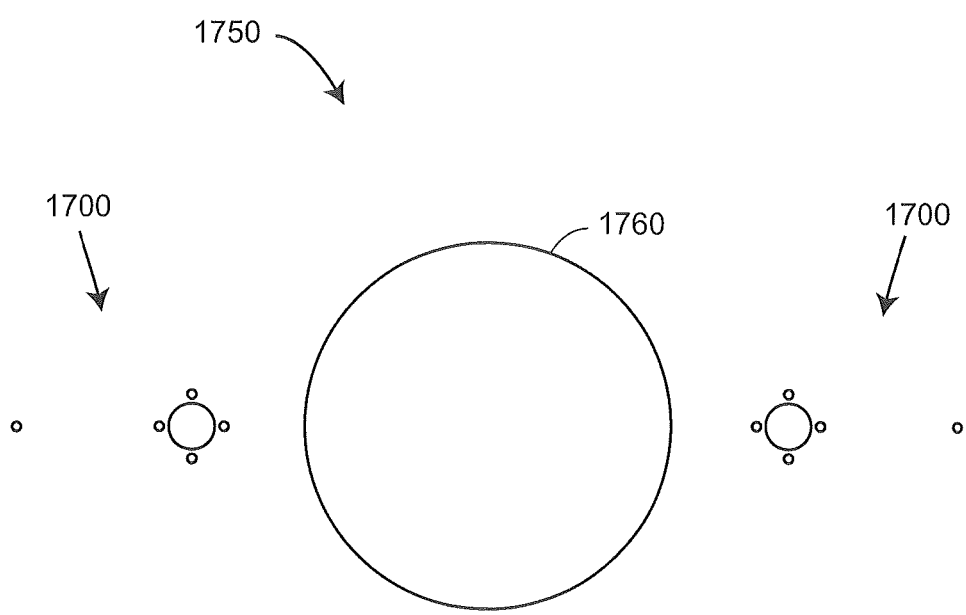
FIG. 17B shows a tracker aperture with locator cameras and light located to the right and to the left according to an embodiment.

A fourth method for establishing a coarse orientation is to use a region of reflective material, which may be located at positions 822 or 922, for example. In general, most reflective materials do not reflect light in so narrow a beam width as a retroreflector such as a cube corner or high quality cateye. Because of this disparity in reflectance, the reflective material may require a much larger exposure than would a cube corner or cateye. Such a long exposure may result in blooming of the image on the photosensitive array of the locator camera. To get around this problem, at least one light may be placed relatively near to the lens system of the locator camera 52 and at least one light may be placed relatively far from the lens system. As shown in FIGS. 17A-C of the '758 patent, a light must be placed relatively close to the locator camera for the light to be captured by the locator camera. On the other hand, because reflective materials, even those that are intended to be highly reflective or "retroreflective", reflect light at a relatively large angle, a light that is relatively far from a locator camera will succeed in reflecting light off the reflective material and into the locator camera. Such an arrangement is shown in FIGS. 17A-B. FIG. 17A shows a locator camera/illumination system 1700 that includes a locator camera/illumination system 1710 and a more distance light source 1720. The locator camera/illumination system 1710 includes a locator camera 1712 and at least one light source 1714. The locator camera may include a lens system (not shown) and a photosensitive array (not shown). FIG. 17B shows two locator camera/illumination systems 1700 placed on the two sides of the entrance/exit aperture 1760 of the device.

Figure 18A:
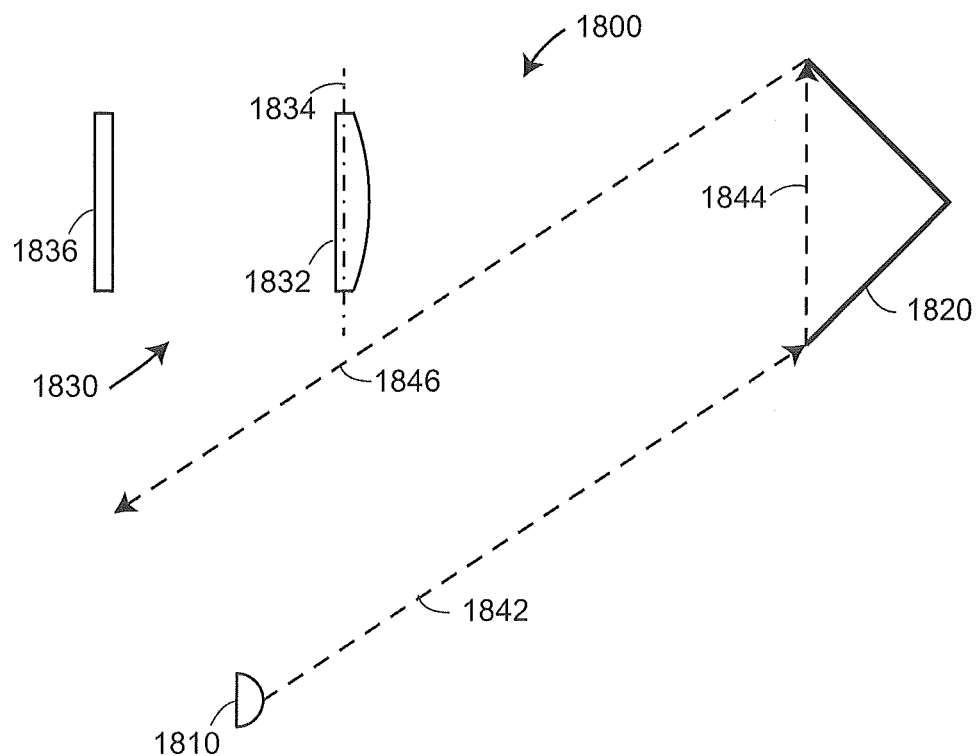
FIG. 18A shows a light that illuminates a retroreflector but does not strike a tracker locator camera.
Figure 18B:
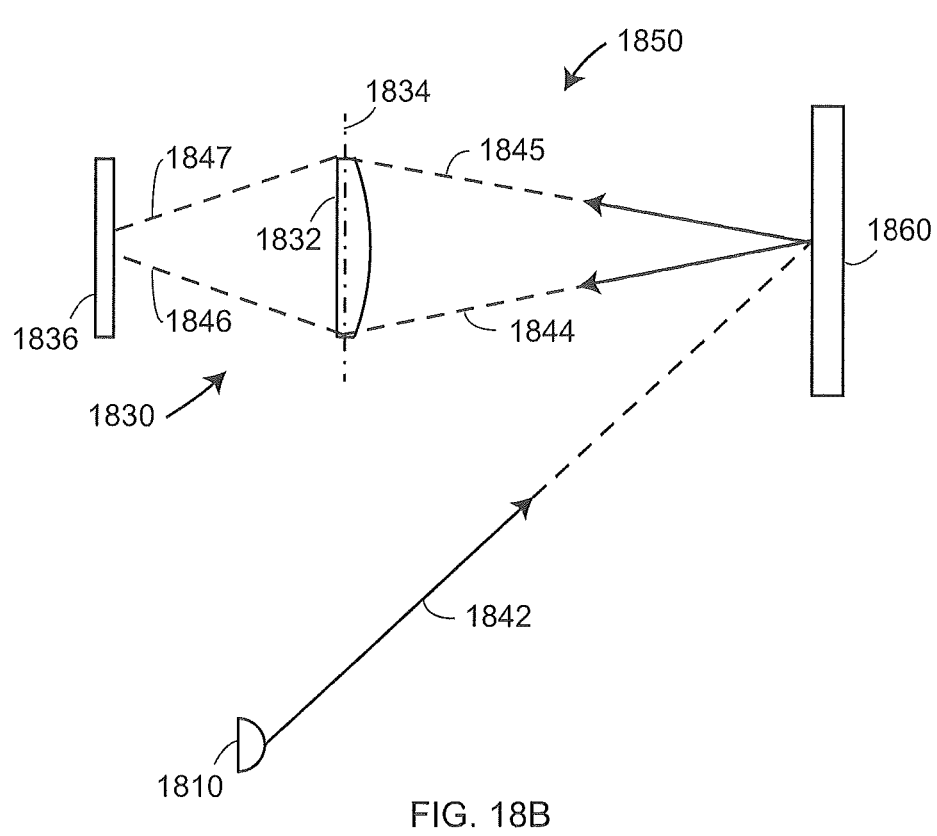
FIG. 18B shows a light that illuminates a region of reflective material, producing scattered light that strikes the tracker locator camera.

FIGS. 18A-B depict the principle behind the method described hereinabove. In FIG. 18A, light from a light source 1810 is reflected off retroreflector 1820, which might be any type of retroreflector. For a high quality retroreflector such as a cube corner retroreflector, each ray of light results in a parallel ray of light reflected backwards. If a ray of light is incident on the retroreflector, but offset with respect to the retroreflector reference point (e.g., vertex), then the reflected ray of light will be offset by the same amount on the other side of the retroreflector reference point. Hence, as shown in FIG. 18A, a light source 1810 located far from the locator camera 1830 cannot illuminate a retroreflector 1820 in a way that causes reflected light to be captured by the lens 1832 and photosensitive array 1836. On the other hand, as shown in FIG. 18B, a light source 1810 located far from the locator camera 1830 can illuminate a region of reflective material 1860 in a way that causes reflected light to be captured by the lens 1832 and photosensitive array 1836. Hence by flashing a light close to the tracker, the position of the retroreflector can be identified. By flashing a light far from the tracker, the position of the reflective region can be identified. In the latter case, the illumination can be left on as long as desired since the light from the cube corner retroreflector will not be present to saturate the locator camera and cause blooming.

In general, it is only necessary to determine the coarse orientation when the laser tracker has stopped measuring a target for a period of time. During continuous measurement, the position of the retroreflector is known to relatively high accuracy based on the previous measurement, and so a coarse measurement is not needed.

Figure 19:
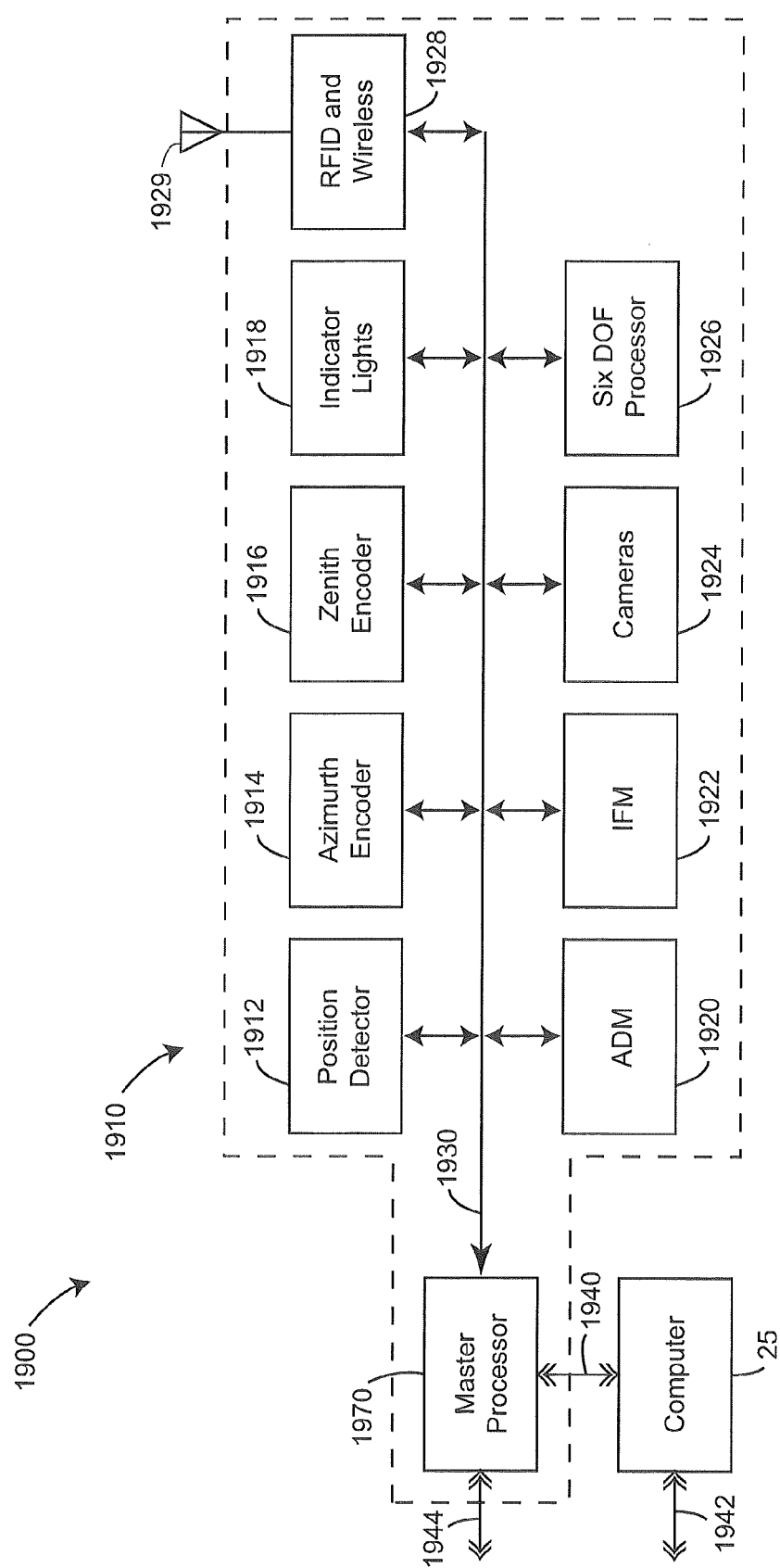
FIG. 19 shows electronics and processors within a laser tracker according to an embodiment.

FIG. 19 shows electrical and computing components within and outside the laser tracker 10. These electrical and computing components are merely representative, and it should be understood that other configurations are possible. A master processor 1970 sends and receives data messages to processors within the laser tracker. These messages may be sent over a wired, optical, or wireless device bus 1930. Processing may be independently carried out for functions within the laser tracker. For example, there may be a position detector processor 1912, azimuth encoder processor 1914, zenith encoder processor 1916, ADM processor 1920, interferometer processor 1922, locator and orientation cameras processor 1924, six-DOF processor 1926, indicator lights processor 1918, and RFID and wireless processor 1928. The RFID and wireless processor 1928 may be connected to an antenna 1929 for emitting or receiving radio frequency (RF) signals. The master processor 1970 may be enclosed in a box such as the interface box 70 of FIG. 2. Alternatively, it may be integrated into the electronics internal to the tracker body. The signals from the master processor may go to an external computer 25 or be connected to a network 1944, 1942.

Figure 20:
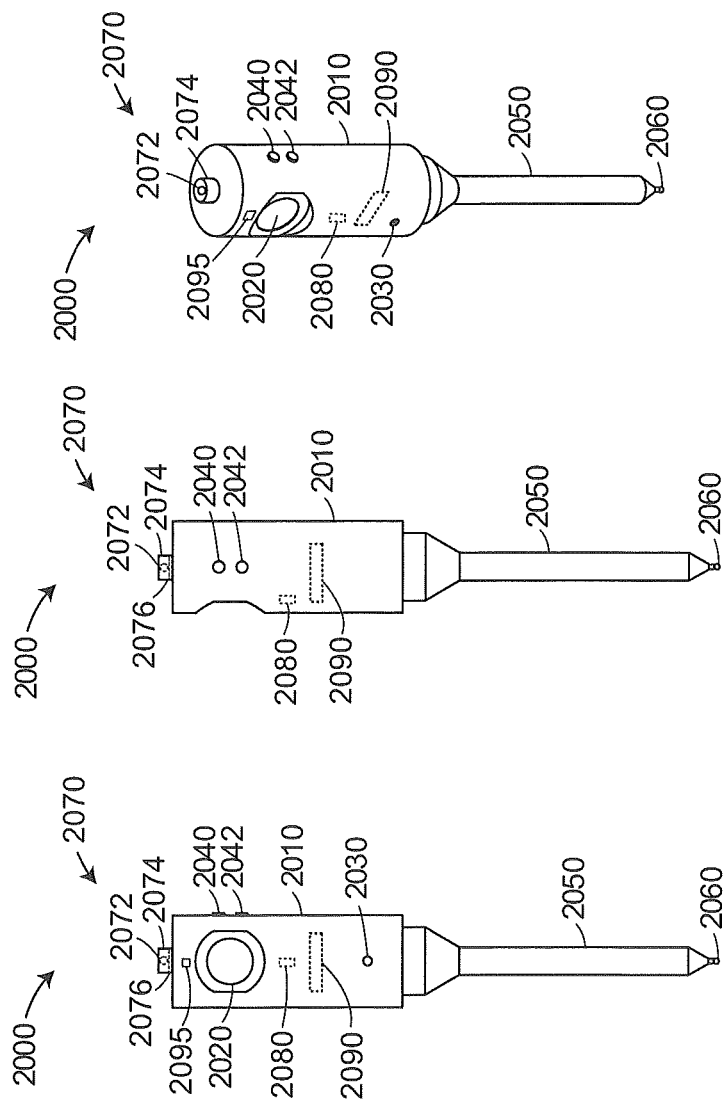
FIGS. 20A-C show an exemplary six-DOF target having a probe tip and a probe extension according to an embodiment.

Many of the elements described in FIGS. 8D and 9D can be similarly applied to a target having a probing extension. FIGS. 20A-C depict an exemplary six-DOF target, or probe assembly 2000, having a probe tip 2060 and a probe extension 2050. A housing 2010 holds a retroreflector 2020. Housing 2010 may contain a reference feature 2030 such as a reference mark, a reference retroreflector, a region of reflective material, or a target light source. It may contain a battery (not shown) connected to a compact circuit board holding electrical components (not shown). An antenna 2090 or light source may be connected to the circuit board to enable transmission of wireless messages using electromagnetic signals. Actuator buttons 2040, 2042 may be connected to the circuit board to enable the operator to send wireless messages to the laser tracker or other device.

A material temperature sensor 2080 attached to the circuit board may be connected to the retroreflector 2020 or housing 2010 to measure the temperature and use this information to correct the measured position of 2060 to account for thermal expansion or thermal changes in the index of refraction. An air temperature sensor assembly 2070 may be used to measure the temperature of the air as a function of location within the measurement volume. The air temperature assembly 2070 includes an air temperature sensor 2072, a protector 2074, and an insulator 2076. The temperature sensor may be a thermistor, RTD, thermocouple, or any other device capable of measuring temperature. It may be placed in a protector structure, which might be a hollow cylinder, for example. The purpose of the protector is to keep the temperature sensor from being damaged and to keep heat sources away from the temperature sensor. The protector is open at the end and may contain perforations to increase exposure of the temperature sensor to air. Insulation 2076 is provided between the housing 2010 and the air temperature sensor 2072. The insulation keeps the sensor from being exposed to the metal of the target, which may be at a different temperature than the surrounding air. The uses of the air temperature sensor are similar to those described hereinabove with regard to FIGS. 8D and 9D.

An electrical memory component on the electrical circuit board may be used as an identifier to send information stored on the memory component to a transmitter on the electrical circuit board that sends the information over the antenna 2090 or over a light source. Such information might include a serial number to identify the target or at least one parameter. The parameter may indicate, for example, geometrical, optical, or thermal properties of the target. Alternatively, identification information may be stored on a bar-code pattern or an RFID tag. The bar-code pattern may be read by a locator camera disposed on the tracker and the RFID tag may be read by an RF reader on the laser tracker or other device.

Figure 21:
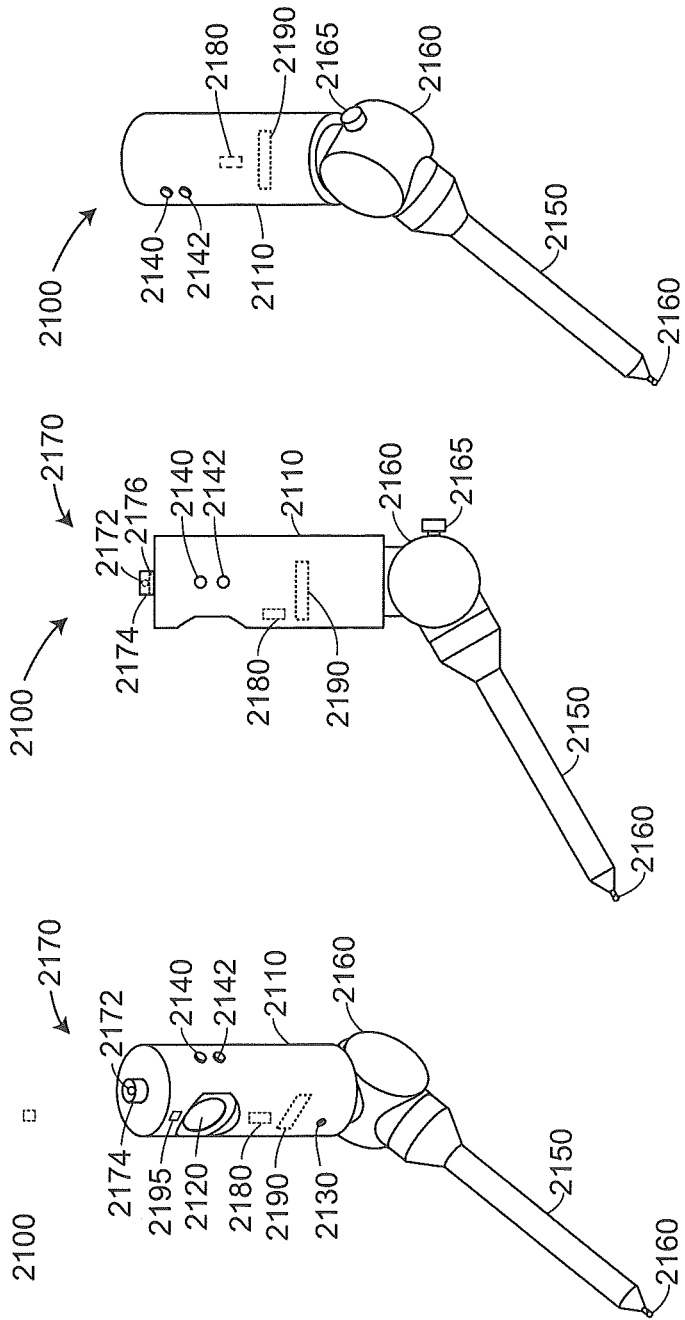
FIGS. 21A-C show a six-DOF probe similar to that in FIGS. 20A-C except that the probe extension is tilted at an arbitrary angle and locked in place with knob according to an embodiment.
Figure 22:
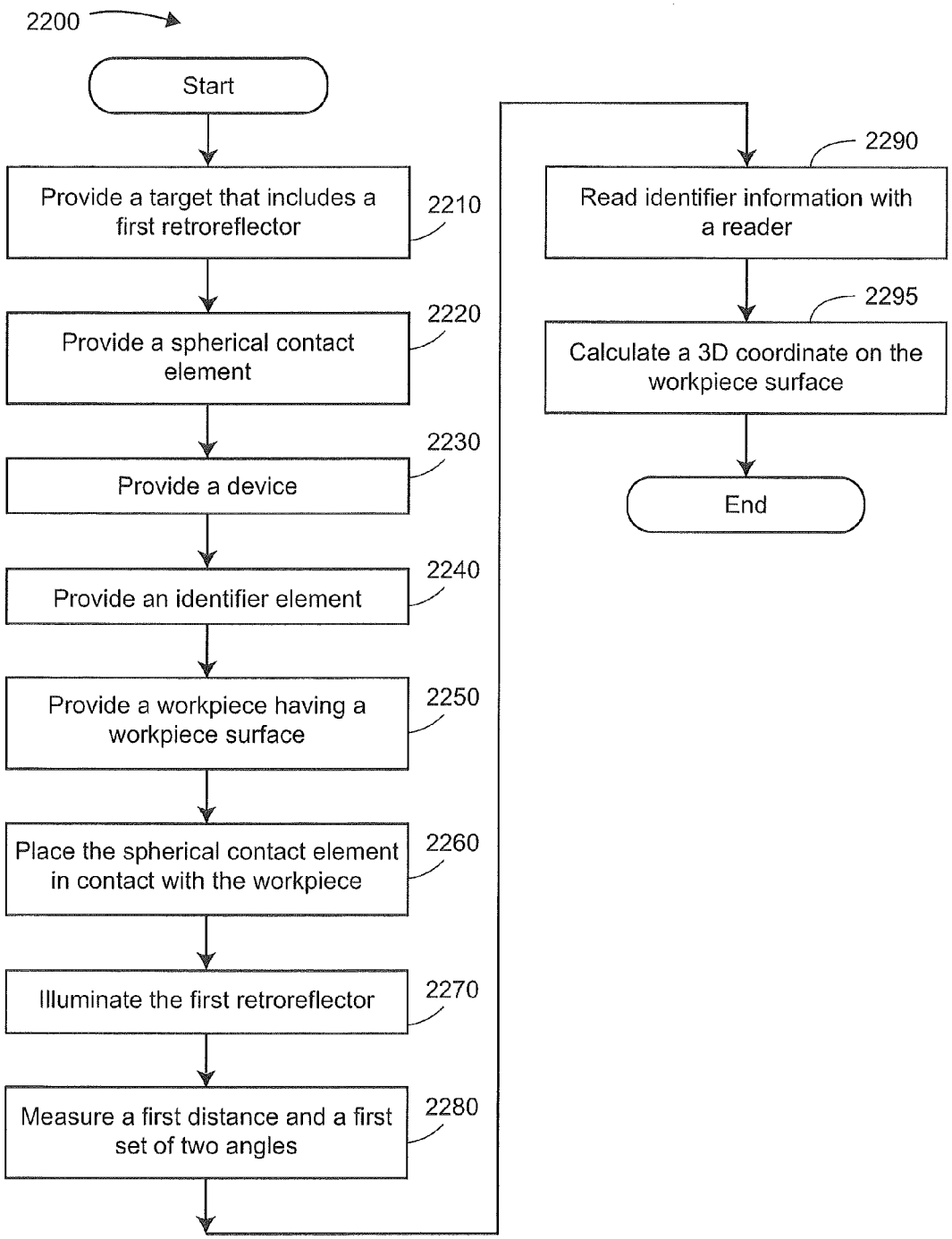
FIG. 22 shows the steps in a method for measuring a point on a workpiece using a target having an identifier element according to an embodiment.

FIGS. 21A-C depict another embodiment for a six-DOF target, or probe assembly 2100. This probe is similar to that described hereinabove with regard to FIGS. 20A-C except that the probe extension 2150 is tilted at an arbitrary angle and locked in place with knob 2160. The components 2120, 2130, 2140, 2142, 2170, 2180, 2190, and 2195 perform the same function as the components 2020, 2030, 2040, 2042, 2070, 2080, 2090, and 2095, respectively, as described hereinabove.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for measuring a point on a surface, comprising:
    a target having a body, a retroreflector, an interface member, a transmitter, a protector, and a temperature sensor, the body having at least a portion with a spherical curvature, the portion configured to contact the point on the surface;
    wherein the retroreflector is coupled to the body;
    wherein the interface member is coupled to the body adjacent the retroreflector;
    wherein the transmitter is coupled to the interface member and configured to emit an electromagnetic signal;
    the protector is coupled to and extending from the interface member, the protector having an open end, the open end being directly exposed to an environment to be measured;
    wherein the temperature sensor is configured to directly measure an air temperature through the open end and configured to send the measured air temperature to the transmitter, wherein the retroreflector, the transmitter, and the temperature sensor are coupled to the body; and
    a processor configured to determine an index of refraction of air along a measurement path, the index of refraction based at least in part on a plurality of air temperatures measured by the temperature sensor at a plurality of positions between a laser tracker and the target.

2. The target of claim 1 wherein the temperature sensor is a thermistor, RTD or a thermocouple.

3. The target of claim 1 wherein the protector includes perforations.

4. The target of claim 1 further comprising an insulation member disposed between the body and the temperature sensor.

5. The target of claim 4 wherein the protector is disposed between the insulation member and the temperature sensor.

* * * * *